(12) United States Patent
Chernikhova et al.

(10) Patent No.: US 10,296,959 B1
(45) Date of Patent: May 21, 2019

(54) AUTOMATED RECOMMENDATIONS OF AUDIO NARRATIONS

(71) Applicant: Audible, Inc., Newark, NJ (US)

(72) Inventors: Darya Chernikhova, New York, NY (US); Thomas Schaaf, Pittsburgh, PA (US)

(73) Assignee: Audible, Inc., Newark, NJ (US)

( * ) Notice: Subject to any disclaimer, the term of this patent is extended or adjusted under 35 U.S.C. 154(b) by 1087 days.

(21) Appl. No.: 14/673,745

(22) Filed: Mar. 30, 2015

(51) Int. Cl.
*G06F 17/00* (2019.01)
*G06Q 30/06* (2012.01)
*G10L 19/02* (2013.01)
*G10L 25/48* (2013.01)
*G10L 13/033* (2013.01)
*G09B 5/06* (2006.01)

(52) U.S. Cl.
CPC ..... *G06Q 30/0631* (2013.01); *G06Q 30/0643* (2013.01); *G10L 19/02* (2013.01); *G10L 25/48* (2013.01); *G09B 5/062* (2013.01); *G10L 13/033* (2013.01)

(58) Field of Classification Search
CPC .............................. G09B 5/062; G10L 13/033
See application file for complete search history.

(56) References Cited

U.S. PATENT DOCUMENTS

2006/0074861 A1* 4/2006 Wilensky .......... G06F 17/30038
2013/0257871 A1* 10/2013 Goldstein ............ G11B 27/034
345/440

* cited by examiner

*Primary Examiner* — Thomas H Maung
(74) *Attorney, Agent, or Firm* — Knobbe, Martens, Olson & Bear, LLP

(57) ABSTRACT

Systems and methods are provided for automated analysis of audio recordings and/or automated recommendations of audio recordings. The audio recordings may be automatically analyzed based on power, frequency, tempo, complexity, dimensionality, other audio features, and/or some combination thereof. Automated recommendations of audio recordings may be provided based at least on the variability levels. User interfaces may be provided to receive user feedback of preferred audio recordings and to select audio recordings to recommend based on the user feedback and the automated analysis. The automated recommendations may be further based on user purchase data and/or listening history.

20 Claims, 13 Drawing Sheets

AUTOMATED RECOMMENDATIONS OF AUDIO NARRATIONS

BACKGROUND

Retailers and merchants involved in electronic commerce of audiobooks often provide user interfaces from which a user may browse audiobooks included in an electronic catalog and/or search an electronic catalog for audiobooks available for purchase. For example, an audiobook retailer may provide customer reviews or ratings of the audio narrations of audiobooks to users. Some user interfaces may provide manually curated collections of audiobooks to users as recommendations. Filtering or sorting options may be provided to allow a user to browse collections of audiobooks based on customer reviews or ratings. Customer reviews, ratings, or manually curated collections may be based on a human listening to and evaluating an audiobook based on a quality of the audio narration.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
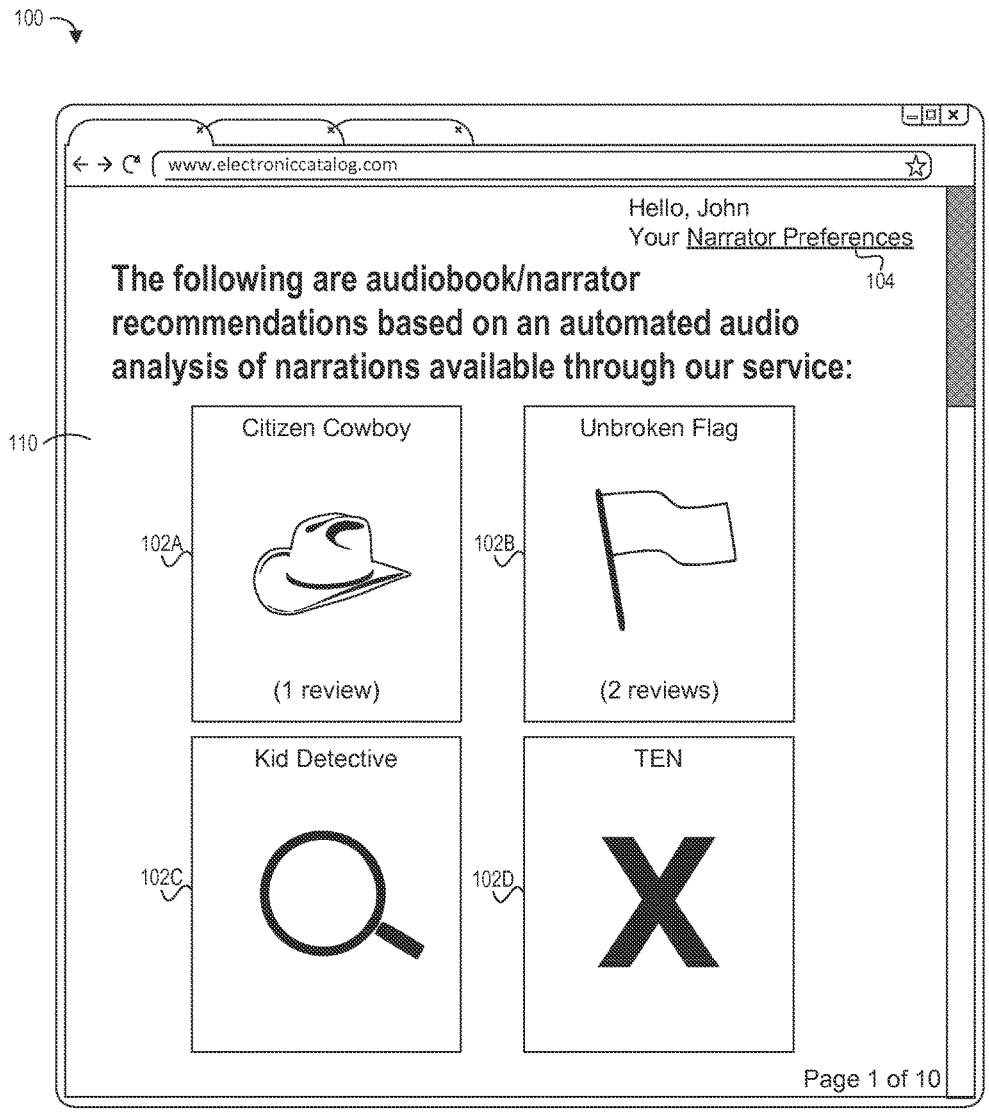
FIGS. 1A and 1B are pictorial diagrams depicting example user interface representations illustrating automated narrator and/or narration recommendations based on automated audio analysis.

Due to the ever-increasing amount of audio information available to users of electronic catalog services and other network services, there is an ongoing need to efficiently recommend, organize, and/or present audio items to users. In existing systems, such audio items are often manually curated and/or organized by human users. For example, humans may listen to audiobooks to review and/or evaluate the audio narration of the audiobook. Human evaluation and/or manual review by a retailer of a large electronic catalog of audiobooks may be difficult, time-consuming, and/or expensive. In some embodiments of the present disclosure, an electronic catalog of audiobooks and/or a portion of those audiobooks may be automatically analyzed to determine and/or predict whether the narrations from the audiobooks may be engaging to humans. In some embodiments, the systems and methods described herein may be used to provide early automated feedback of short audio samples to content creators and/or narrators before time, money, and/or effort is expended recording the complete audio product. Furthermore, an electronic catalog of audiobooks may be automatically analyzed to rank the audiobooks based on the quality of their narration, recommend audiobooks to be promoted, and/or to order audiobook search results.

Generally described, aspects of the present disclosure relate to automated recommendations of audio content based on an analysis of user preferences and/or features of the audio content. For example, according to some embodiments, a collection of audio recordings and/or audiobooks may be analyzed to determine variability levels and/or scores associated with the audio recordings. For example, as described herein, variability levels and/or scores may be based on a power, frequency, and/or tempo of a recorded voice in the audio recording. In some embodiments, an audio recording may be processed to generate a Fourier series using a Fourier transform algorithm, which may be analyzed by the systems and methods described herein. For example, a Fourier series may be graphed and fractal analysis methods may be used to analyze the complexity of the graph. The one or more complexity and/or variability levels may be used as an indicator for how likely a human user may find an audio recording engaging. In some embodiments, the variability levels and/or scores of power, frequency, tempo, and/or other features may be used to provide user recommendations of audiobooks that are new and may have zero or very few customer ratings and reviews. Furthermore, purchase and/or listening history may be used to provide personalized recommendations using the one or more variability levels for power, frequency, tempo, and/or other features.

Alternatively or additionally, a user interface may be provided that provides an audio recommendation based on one or more user selections and/or preferences. For example, a user may be provided with one or more aural presentations of audio recordings. In the example, the user interface may receive one or more user selections and/or user feedback indicating a preference for one or more of the audio recordings. An audio recording and/or narrator that has not been previously presented to the user may be selected from the electronic catalog based on the user selections and/or feedback. For example, an audio recording may be selected based on comparisons of variability levels of the audio recording with variability levels of the selected one or more audio recordings. In other words, a narrator may be automatically selected from a catalog of narrators based on user preferences of a subset of narrators that a user has indicated that the user likes and/or prefers. For example, the selected one or more audio recordings may indicate a user's preference for female voices with the pitch in a certain range and a tempo variability within a particular threshold. The automated analysis of the electronic catalog and/or library may provide audio metadata that may be compared with the user preferences to select and/or recommend audio items via the user interface.

In some embodiments, an electric catalog may include audio recordings from various narrators. The audio narrations may be from multiple human narrators of varying skill levels and/or experience. An experienced narrator may speak with varied emotions, tempo, power, frequency, among other features, to engage and/or connect with the listener. For example, features of engaging audio narrations may include non-repeating variations in tone, volume, overtone, tempo, speed, frequency, power, mellifluousness, and/or pauses, which may represent human emotion. However, an inexperienced narrator may speak in a hurried, staccato, and/or monotonous tone that a listener may not enjoy. Thus, systems and methods that automatically analyze and/or score audio narrations may be advantageous to provide recommendations for likely and/or predicted engaging audio narrations, to flag poor narrations, and/or to categorize audio narrations before receiving customer and/or user feedback. As will be appreciated, one or more target levels of engagement and/or variety sought in a voice recording may vary between types of content (e.g., different vocal characteristics may be more appropriate for reporting of a factual news story than for a romance novel) and/or based on the listening preferences of specific listeners.

As used herein, a "variability level" sometimes refers to the variations of audio data and/or voice features in the audio data that may be used as indicators of complexity, emotion, and/or richness in speech. For example, a variability level may be associated with one or more of frequency, tempo, and/or power, among others, of the audio data and/or a voice in the audio data. Generally, a variability level can identify aspects of engaging audio narrations such as, but not limited to, non-repeating variations in tone, volume, overtone, tempo, speed, frequency, power, mellifluousness, and/or pauses. Thus, a variability level can represent the non-repetitiveness of one or more audio data features, such as, but not limited to, tone, volume, overtone, tempo, speed, frequency, or power. Additionally, a "feature score" sometimes refers to a value representing one or more of pitch, frequency, tempo, power, particular phonetic patterns, particular phonemes, and/or any other aspect of audio data. A variability level can be determined with respect to a particular feature such as, but not limited to, power or tempo. However, a variability level differs from a feature score in that a variability level can, in some embodiments, refer to the change of a feature over time, such as fluctuations in power or tempo. Some example feature scores include, but are not limited to, values that identify the gender and/or accent of the voice from an audio recording. For example, a feature score for gender or accent may be a value representing the predicted likelihood that a given narrator is of a certain gender or has an accent, respectively. The predicted likelihood may be determined using an automated analysis of features of an audio recording, such as, but not limited to, a detected pitch within the audio recording. As described herein, one or more machine learning techniques may be used to train a gender classifier based at least on the range of pitches from an audio recording. In some embodiments, a feature score for a predicted accent of the narrator for an audio recording may be determined using one or more machine learning techniques to train classifiers of accents based on detected phonetic patterns and/or particular phonemes.

While reference is frequently made herein to audiobooks, narration audio recordings, audio clips, audio data items, etc., it will be appreciated that audio and/or media content may include any type of content that is presented continuously over time with audio. Examples of continuously presented audio content may include audiobooks, podcasts, blogs, narrator audition clips, news programs, television programs, video clips, movies, multimedia content, and any other type of content having an audio component and/or spoken words. A narration audio recording includes audio data of spoken words. Example audio narration recordings include, but are not limited to, an audiobook or an audition clip by a voice actor.

FIG. 1A is a pictorial diagram depicting an example user interface representation illustrating automated narrator and/or narration recommendations based on automated audio analysis. Illustrative user interface 100 includes recommendation area 110. In some embodiments, recommendation area 110 provides automated audiobook recommendations. As illustrated, audiobooks 102A and 102B have a small number of customer reviews and audiobooks 102C and 102D have zero customer reviews. A listenability service, as described herein, may automatically provide recommendations for audiobooks based on a predicted likelihood that users will prefer the audio narrations and/or will provide positive ratings for the audio narrations. In some embodiments, the recommendations may be provided based on an automated analysis of the electronic catalog by the listenability service. Alternatively or additionally, the recommendations may be based at least in part on user purchase and/or listening history, which is described in further detail herein.

In some embodiments, audiobook and/or narrator recommendations may be based on narrator preferences. User interface 100 includes a preference selector 104. In some embodiments, user selection of preference selector 104 may provide a user with one or more options to select narrator preferences that will be used to provide narrator recommendations. For example, selection of preference selector 104 may navigate the user to a narrator finder, which is described in further detail with reference to FIGS. 2A-2C. Alternatively or additionally, selection of preference selector 104 may provide a user interface (not illustrated) to receive user input data associated with a representative narrator and/or audio recording that a listenability service may use to further recommend audio recordings, which is described in further detail herein. In some embodiments, narrator preferences (not illustrated) may include one or more features for selecting a desired tone, volume, overtone, speed, tempo, power, or any other audio feature. Thus, in some embodiments, a listenability service may use the one or more user-specified narrator preferences to determine narrator recommendations.

Figure 1B:
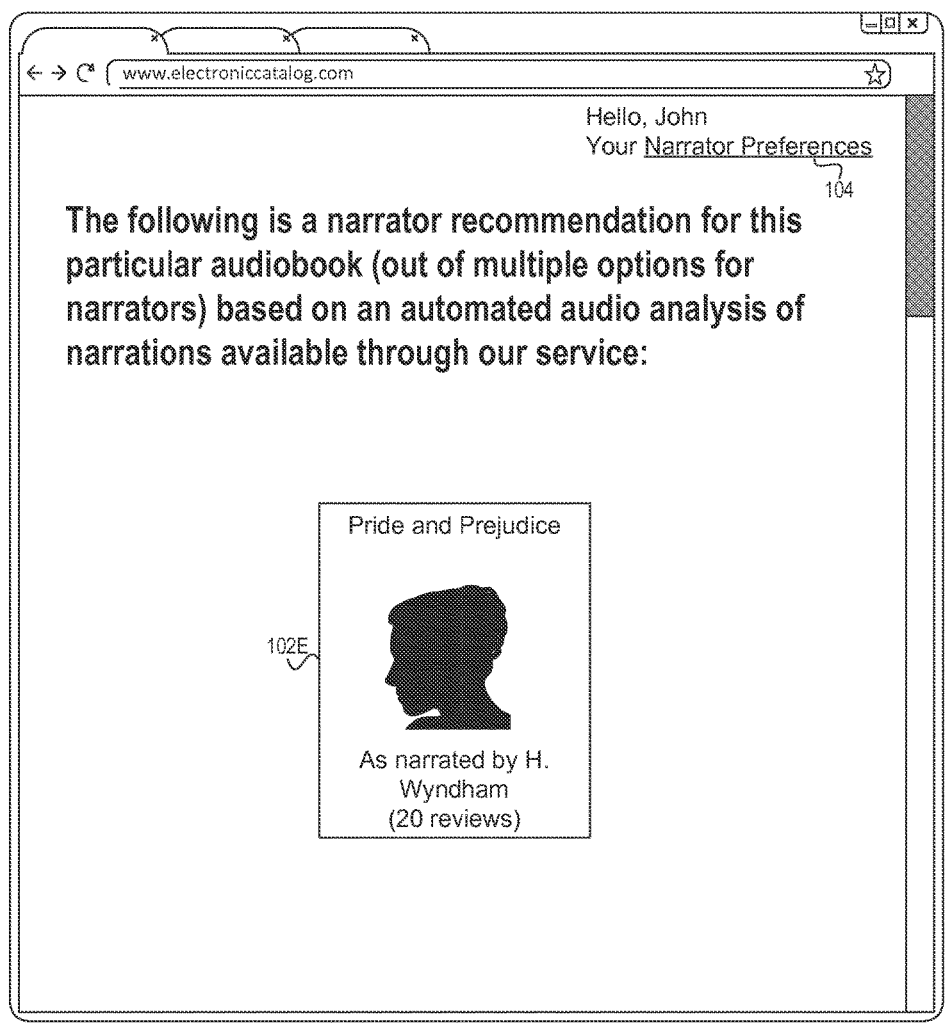

FIG. 1B is a pictorial diagram depicting another example user interface representation illustrating automated narrator and/or narration recommendations based on automated audio analysis. Many elements of user interface 160 may be similar to user interface 100 of FIG. 1A. However, the types of recommendations provided from example user interface 160 may differ from the types of recommendations provided from example user interface 100. For example, recommendation 102E may be for one or more particular narrations out of several narrations available for the book, "Pride and Prejudice." For particular books, such as classics, the electronic catalog may contain several different audiobook variations in which different narrators narrate the same underlying book. Thus, recommendation 102E may be based on automated analysis of the electronic catalog and particular narrator preferences, listening history, and/or purchase history from the user, as described in further detail herein. Thus, user interfaces 100 and 160 of FIGS. 1A and 1B, respectively, may illustrate recommendations as provided by generalized and/or personalized recommendation services.

Figure 2A:
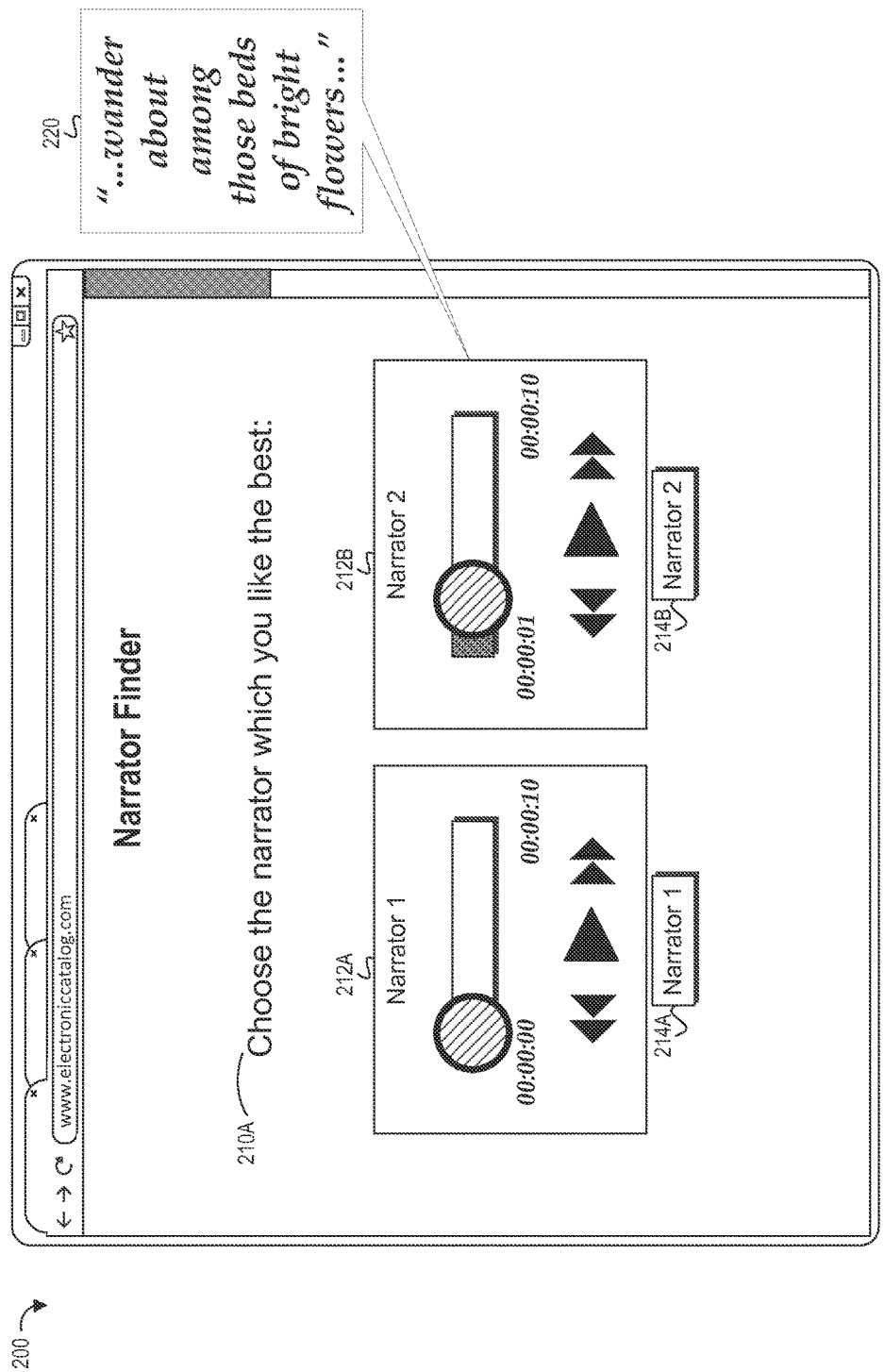
FIGS. 2A-2C are pictorial diagrams depicting an example sequence of user interface representations illustrating receiving user feedback that is used to provide a narrator recommendation.
Figure 2B:
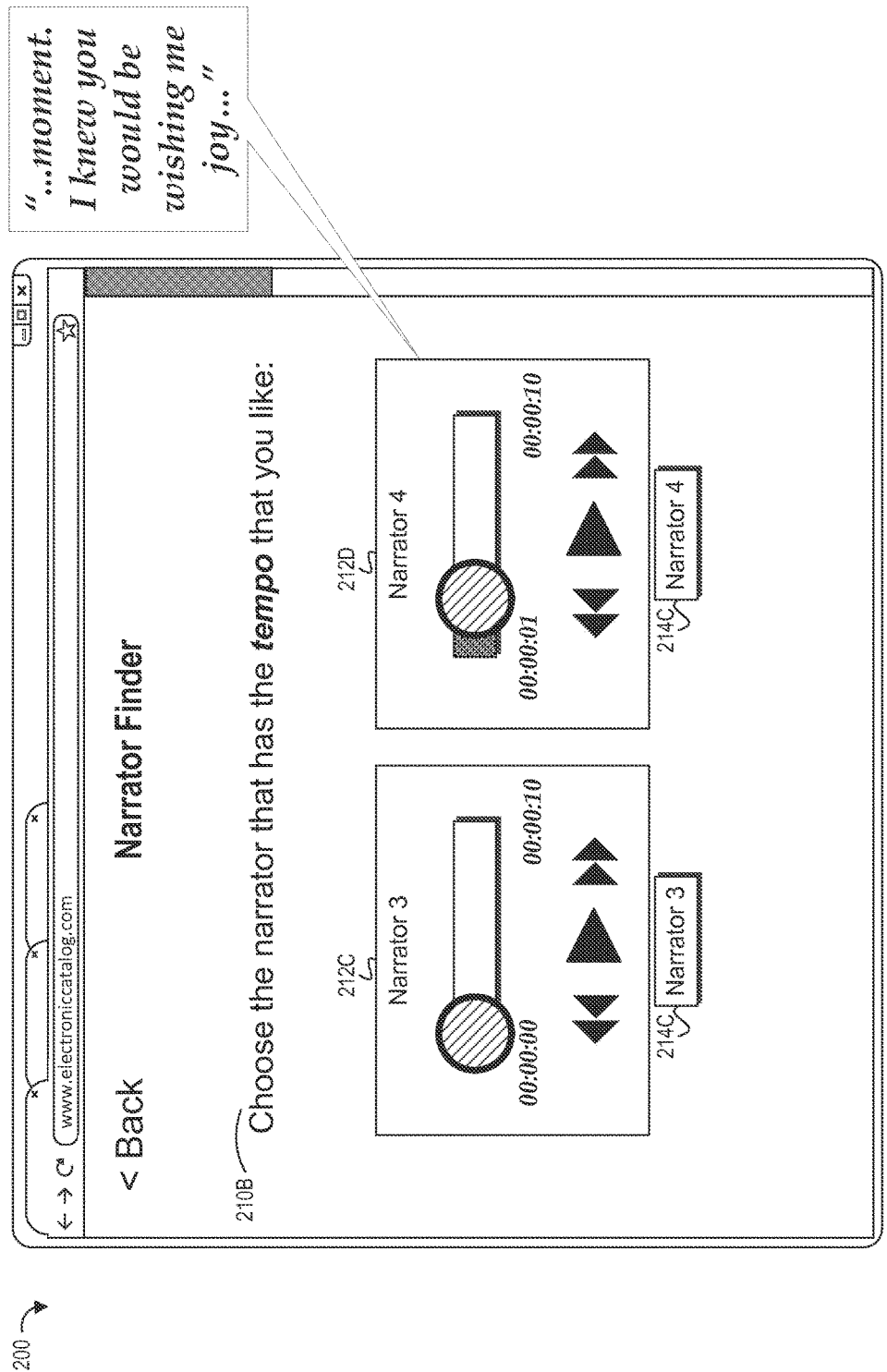
Figure 2C:
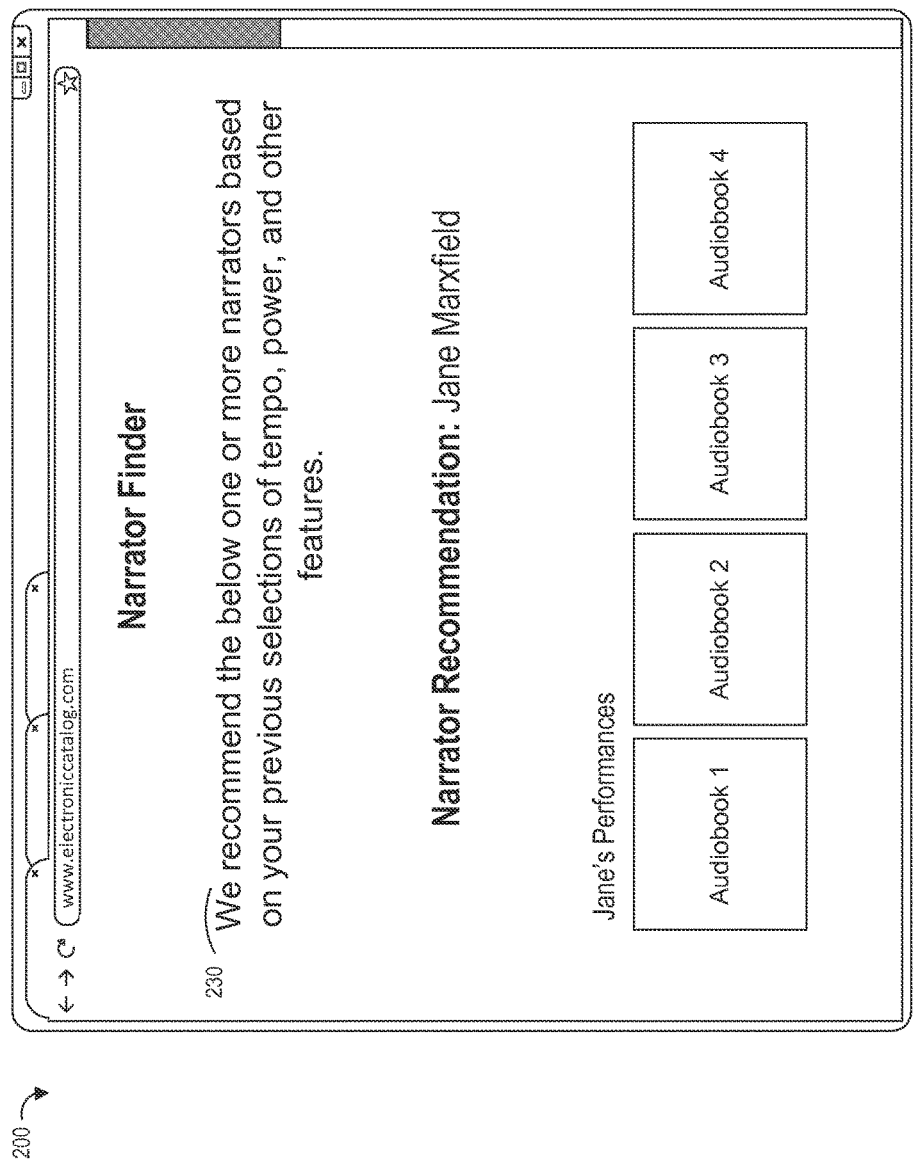

FIGS. 2A-2C depict an example sequence of user interface representations illustrating receiving user preferences and/or selections of preferred narrations that are then used to provide a narrator recommendation. Illustrative user interface 200 may receive one or more user selections to provide a narrator recommendation based on the one or more user selections. Illustrative user interface 200 of FIG. 2A includes playback control areas 212A and 212B, which may correspond to "Narrator 1" and "Narrator 2," respectively. User selection of controls of playback control areas 212A and 212B may cause the aural presentation of audio associated with playback control areas 212A and 212B, respectively. For example, a user computing device and/or user interface 200 may aurally present audio 220 in response to a user selection of playback control area 212B. Audio 220 may correspond to Narrator 2, where the voice of audio 220 is narrated by Narrator 2. User interface 200 includes user interface elements 214A and 214B. As prompt 210A indicates, a user may select a preferred representative narrator based on the aural presentation of audio recordings and the particular narration that the user prefers (that may then be used to provide a narrator recommendation). For example, user selection of user interface element 214B may indicate that a user prefers the narration style and/or voice of Narrator 2 over Narrator 1. For example, where Narrators 1 and 2 correspond to a male and female voice, respectively, a selection of user interface element 214A may indicate that the user prefers a male voice for audio narration over a female voice.

While not illustrated in FIG. 2A, in some embodiments, prompt 210A may also be more specific as to the feature that the user should select the audio recording based on. For example, prompt 210A may indicate to the user to select the gender of the voice that the user prefers. Other features that may be prompted to the user may include power, frequency, tone, volume, overtone, and/or speed. An example of greater detail in a prompt may be found with respect to prompt 210B of FIG. 2B.

In some embodiments, user interface 200 may include one audio recording instead of the two audio recordings of FIG. 2A. For example, user interface 200 may present playback controls for a single audio recording and user interface elements for indicating a user's preference for the single audio recording. In the example, the user interface elements may correspond to a "like" or "dislike" of the single audio recording, or options to provide more detailed feedback that falls along a spectrum (such as providing options enabling the user to indicate that the user would prefer either a slower tempo or faster tempo than the sample). The feedback received based on selection one of the above-referenced user interface elements may be stored as user rating data, in some embodiments. In other embodiments, user interface 200 may include greater than two audio recordings, such as three, four, or ten audio recordings, and user interface elements corresponding to the greater than two audio recordings.

As illustrated in FIG. 2B, user interface 200 may update following a selection of the user interface element. For example, user interface 200 may update in response to a user selection of user interface element 214A or 214B of FIG. 2A. Playback control areas 212C and 212D may be similar to playback control areas 212A and 212B of FIG. 1, except that playback control areas 212C and 212D may correspond to different audio recordings than the audio recordings associated with playback control areas 212A and 212B. Prompt 210B may update from prompt 210A of FIG. 1. For example, prompt 210B may provide an indication to the user to select the audio recording that has a tempo that the user prefers. For example, the audio corresponding to Narrator 3 may have a faster tempo than the audio corresponding to Narrator 4, or the audio corresponding to Narrator 3 may have a higher variability of tempo than the audio corresponding to Narrator 4. In some embodiments, the audio recordings of FIGS. 2A and 2B may correspond to portions of longer audio recordings or audiobooks. For example, the audio recording that is playable from playback control area 212B and/or audio 220 of FIG. 2A may correspond to a sample portion of an audiobook. As illustrated, the sample audio recording may be ten seconds of an audiobook that is twelve hours long. In some embodiments, the sample portions of audio may be selected by the listenability service, as described herein, by identifying that the audio data within the given sample portions are representative of given variability levels and/or feature scores of the audiobook from which the sample is selected, and/or that the two selected samples correspond to the end points of a given range of variability levels and/or feature scores that have been previously found to be preferred by users.

As illustrated in FIG. 2C, user interface 200 may provide a narrator and/or audio recording recommendation. A narrator and/or audio recording may be selected based on one or more representative audio recordings selected in FIGS. 2A and/or 2B. For example, the recommended narrator, here "Jane Marxfield," may be determined based on the narrator "Jane Marxfield" having audio recordings that have similar features to the previously selected audio recordings, such as the gender of the voice, tempo, power, variability, and/or other features of the audio recordings. In some embodiments, text recommendation 230 may be different, such as including more detail regarding the analyzed features that were used to select the narrator. Thus, example user interface 200 may be considered a "Narrator Finder" that provides a narrator and/or narration audio recording recommendation. In some embodiments, the "Narrator Finder" may be used by customers searching for a narrator for an audiobook or by content producers that are searching for a narrator to record an audiobook. Systems and methods for comparing audio recordings will be described in further detail herein.

In some embodiments, user interface 200 may include multiple pages and/or user interface representations in addition to those illustrated in FIGS. 2A and 2B that may be presented to gather information to determine a recommended narrator and/or audio recording. For example, additional user interface representations in the sequence of user interface 200 may provide additional audio recordings and/or user interface elements associated with other audio features such as frequency, power, speed, and/or other features. Thus, the sequence of user interface representations of FIGS. 2A-2C may correspond to a decision flow and/or tree to receive user feedback and/or preferences to automatically determine an audio recommendation, which is described in further detail with respect to FIGS. 3A and 3B. For example, the user interface elements of FIGS. 2A, 2B, and/or additional user interface representations may provide binary options in a sequence to determine a set of user preferences associated with one or more features, according to some embodiments.

In some embodiments, user interface 200 and/or a narrator finder feature, as illustrated by FIGS. 2A-2C, may provide narrator and/or audiobook recommendations for a particular genre. For example, a user may select a particular genre in user interface 200 (not illustrated) as a preliminary step. Examples of genres include, but are not limited to, "Science Fiction," "Classics," "Autobiographies," etc. Thus, a user may be provided a narrator and/or narration recommendations in user interface 200 of FIG. 2C that are within and/or associated with a particular genre.

Figure 3A:
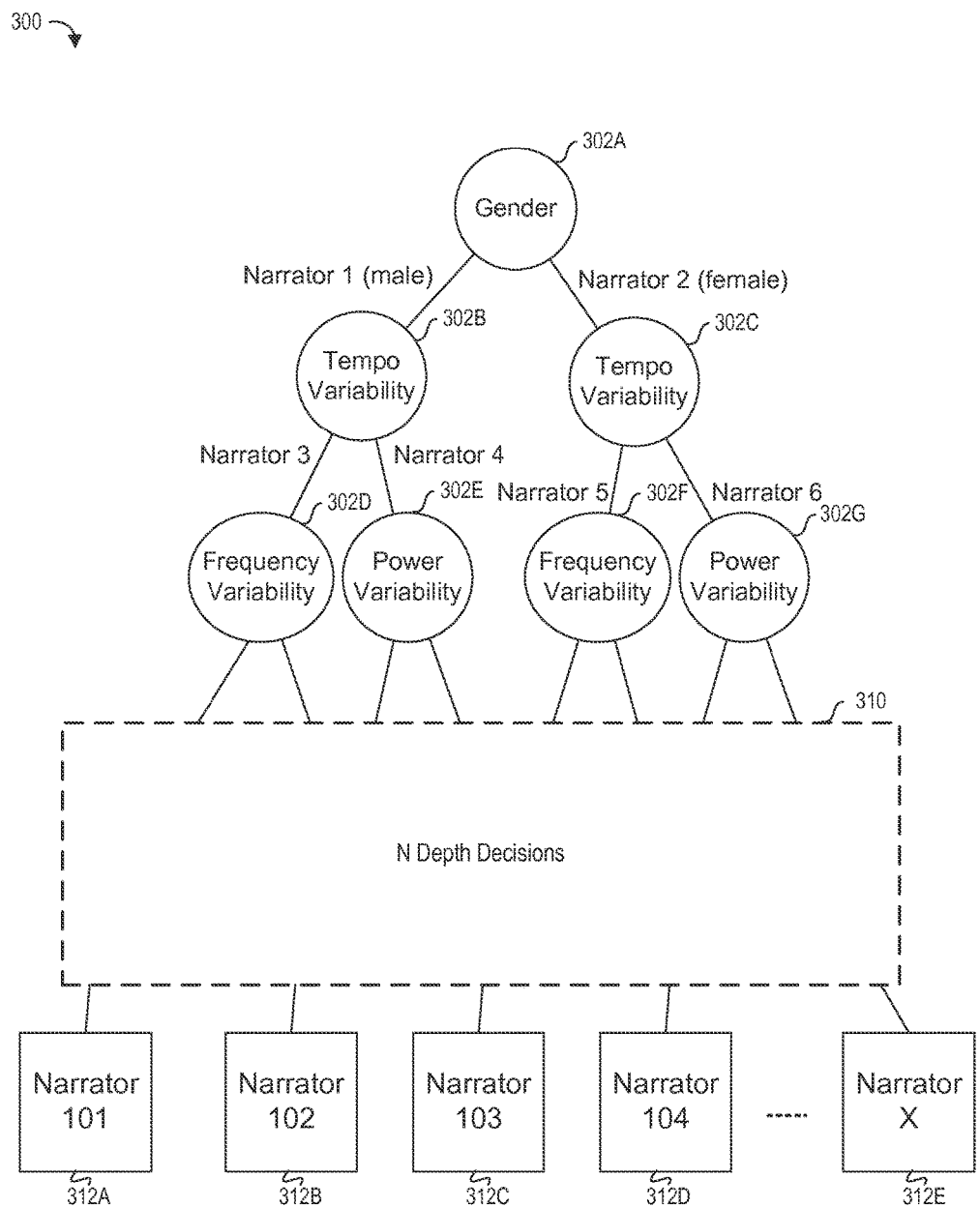
FIGS. 3A and 3B are example representations of decision flows and/or trees for determining a narrator recommendation based on user selections.
Figure 3B:
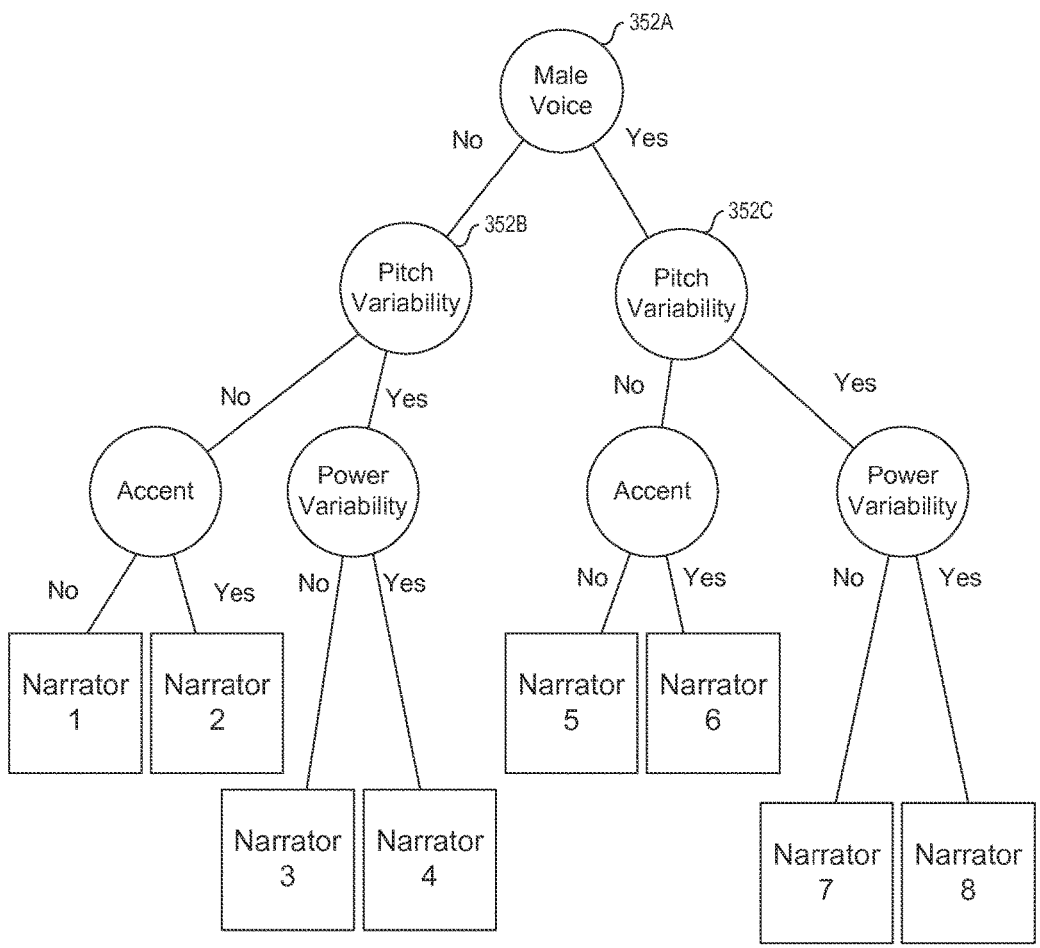

FIGS. 3A and 3B are example representations of decision flows and/or trees for determining a narrator recommendation based on user selections. As illustrated in FIG. 3A, an example representation of a decision flow and/or tree 300 includes one or more decision nodes 302A-302G. Decision nodes 302A-302G may correspond to a prompt or a decision point for determining a user preference regarding one or more features of audio data. For example, decision node 302A may correspond to user interface 200 of FIG. 2A. A user may be prompted to listen to one or more exemplary audio recordings and to select one or more of the audio recordings to indicate their narrator preferences and/or to provide user feedback. Accordingly, decision node 302A may include binary options and/or links corresponding to a male voice (Narrator 1) and a female voice (Narrator 2). Thus, a user may progress to a new decision node in decision flow 300 based on their selection. For example, a user selection of Narrator 1 progresses to decision node 302B, which may correspond to user interface 200 of FIG. 2B. Similarly, a user selection of Narrator 2 progresses to decision node 302C. Node area 310 indicates that decision flow 300 may include a depth of N decision nodes. For example, node area 310 may include a depth of seven more decision nodes, which indicates that a user may be presented with ten audio features and/or a decision flow 300 of a depth of ten nodes. As illustrated, decision flow 300 ends with narrator recommendations 312A-312E. For example, narrator recommendation 312A may be based on the previous user selections and/or the path of decisions from decision flow 300. In some embodiments, each of narrator recommendations 312A-312E may correspond to a single narrator and/or a collection of similar narrators. Thus, narrator recommendation 312A may be a single narrator and/or a cluster of narrators that have features similar to the previously specified user preferences of gender, tempo, power, and/or other features. The depth of decision tree 300 may indicate the various options that may be used to recommend a narrator. Thus, in some embodiments, the greater depth of decision tree 300 may indicate a more accurate narrator recommendation.

FIG. 3B may illustrate another example decision flow and/or tree. Decision flow and/or tree 350 may be similar to decision flow and/or tree 300 of FIG. 3A. For example, narrator recommendations 312A-E of decision flow 300 may be similar to the narrator recommendations of decision flow 250. However, each decision node of flow 350 may correspond to a single audio recording. For example, an audio recording associated with decision node 352A may correspond to recording of a narrator with a male voice. The decision at node 352A may correspond to whether the user prefers the male voice or not, which may correspond to the links from node 352A2 to nodes 352B and 352. Thus, in some embodiments, a user may select whether they "like" or "dislike" an audio recording instead of selecting a representative audio recording.

In some embodiments, decision flow and/or trees 300 and 350 may be implemented in a user interface, a data structure, or by a listenability service, and/or some combination thereof. For example, decision flow and/or trees 300 and 350 may be implemented at least in part by generating and presenting user interface 200 of FIGS. 2A-2C. Alternatively or additionally, decision flow and/or trees 300 and 350 may correspond to a data structure, such as a binary tree and/or decision tree, which may be stored in computer memory. A listenability service, as described herein, may further implement decision flow and/or trees 300 and 350 for determining a narrator recommendation. In some embodiments, a listenability service may progress through a decision tree similar to tree 350 without specifically prompting the user to make selections at each node. For example, if a given user has previously rated a number of narrators and/or audio recordings, the listenability service may infer various preferences of the user based on an automated analysis of the previously rated audio data.

In some embodiments, the particular narrators and/or audio recordings that are presented at a decision node of decision flow 300 and/or 350 may be selected based on previous user selections. For example, if a user selects Narrator 1, which is a male voice, from decision node 302 of FIG. 3A, then the narrators and/or audio recordings presented at decision node 302B may be male voices. In another example, if the selected audio recording has a high frequency variability or a frequency variability within a determined threshold or range, then subsequent presented audio recordings in the decision flow 300 and/or 350 may be selected based on comparisons of respective frequency variability levels with the selected audio recording. Thus, the user selections in decision flow 300 and/or 350 may be cumulative as a user traverses the decision flow 300 and/or 350. A self-adjusting Bayesian algorithm can receive the user selections as input to determine a narrator recommendation, which is described in further detail with respect to FIG. 8. In other embodiments, each decision node of decision flow 300 and/or 350 may be independent in that they do not necessarily include the particular audio feature of parent nodes.

Figure 4:
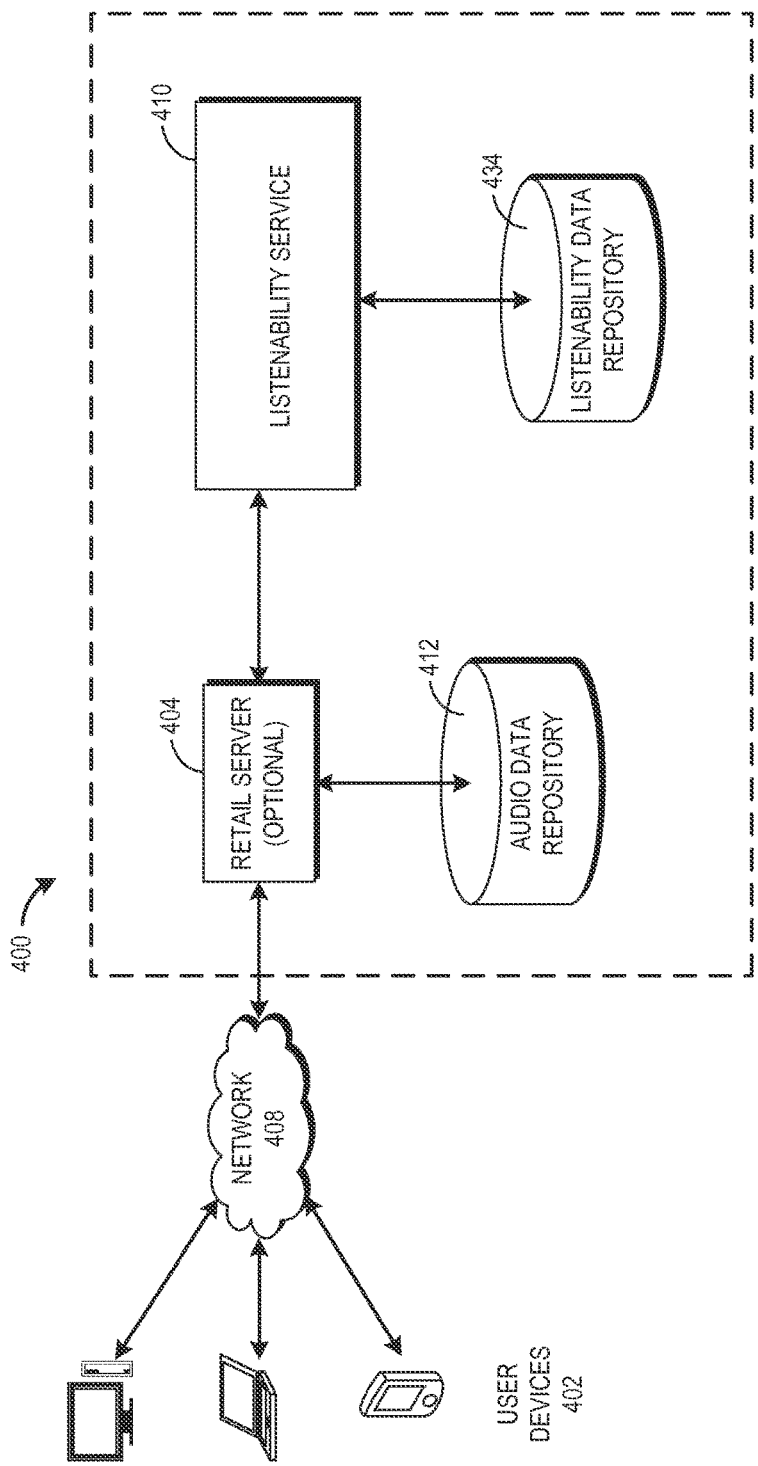
FIG. 4 is a block diagram depicting an illustrative operating environment for presenting users with automated audio and/or narrator recommendations.

The illustrative operating environment shown in FIG. 4 includes an electronic catalog system 400 that enables users to browse and/or select audio items (such as items listed in an electronic catalog and/or library). The catalog system 400 may include a listenability service 410 and a listenability data repository 434 stored in memory therein that may be used to implement various aspects of the present disclosure, such as automatically analyzing audio recordings and/or providing recommendations for audio recordings. Listenability data repository 434 may store audio content metadata, user preferences and/or feedback, variability levels and/or scores, data structures, and/or other data, which is described in further detail herein. The catalog system 400 may also include one or more optional retail servers 404 that facilitate electronic browsing and purchasing of items, such as audiobooks, using various user devices, such as user computing devices 402. User computing devices 402 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

Retail server 404 may be connected to and/or in communication with an audio data repository 412 that stores audio data and item information regarding a number of items, such as items listed in an electronic catalog as available for browsing and/or purchasing via the retail server 404. Audio data stored in item data repository 412 may include any information related to each audio item. For example, audio item data may include, but is not limited to, price, availability, title, item identifier, item images, item description, item attributes, item text, etc. The audio data repository 412 may store digital content items (e.g., audiobooks, electronic books, music, movies, multimedia works, etc.). The retail server 404 may also be connected to or in communication with a user data store (not illustrated) that stores user data associated with users of retail server 404, such as account information, purchase history, browsing history, item reviews and ratings, personal information, location information, etc.

In some embodiments, each of the audio data repository 412 and/or listenability data repository 434 may be local to listenability service 410, may be local to retail server 404, may be remote from both listenability service 410 and retail server 404, and/or may be a network-based service itself. The audio data repository 412 and/or listenability data repository 434 may be embodied in hard disk drives, solid state memories, any other type of non-transitory computer-readable storage medium, and/or a file, a database, a relational database, in-memory cache, and/or stored in any such non-transitory computer-readable medium accessible to the retail server 404. The audio data repository 412 and/or listenability data repository 434 may also be distributed or partitioned across multiple local and/or storage devices without departing from the spirit and scope of the present disclosure.

In the environment shown in FIG. 4, a user of the catalog system 400 may utilize a user computing device 402 to communicate with the retail server 404 via a communication network 408, such as the Internet or other communications link. The network 408 may be any wired network, wireless network or combination thereof. In addition, the network 408 may be a personal area network, local area network, wide area network, cable network, satellite network, cellular telephone network, etc. or combination thereof. For example, the network 408 may be a publicly accessible network of linked networks, possibly operated by various distinct parties, such as the Internet. In some embodiments, the network 408 may be a private or semi-private network, such as a corporate or university intranet. The network 408 may include one or more wireless networks, such as a Global System for Mobile Communications (GSM) network, a Code Division Multiple Access (CDMA) network, a Long Term Evolution (LTE) network, or some other type of wireless network. The network 408 may use protocols and components for communicating via the Internet or any of the other aforementioned types of networks.

The catalog system 400 is depicted in FIG. 4 as operating in a distributed computing environment including several computer systems that are interconnected using one or more computer networks. The catalog system 400 could also operate within a computing environment having a fewer or greater number of devices than are illustrated in FIG. 4. Thus, the depiction of catalog system 400 in FIG. 4 should be taken as illustrative and not limiting to the present disclosure. For example, the catalog system 400 could implement various Web services components and/or peer-to-peer network configurations to implement at least a portion of the processes described herein.

In brief, the retail server 404 is generally responsible for providing front-end communication with various user devices, such as a user computing device 402, via network 108. The front-end communication provided by the retail server 404 may include generating text and/or graphics, possibly organized as a user interface using hypertext transfer or other protocols in response to information inquiries received from the various user devices. The retail server 404 may obtain information on available audio items from one or more data stores, such as audio data repository 412, as is done in conventional electronic commerce systems. In certain embodiments, the retail server 404 may also access item data from other data sources, either internal or external to catalog system 400. While catalog system 400 is often described herein with respect to an embodiment in which listenability service 410 communicates with a retail server 404 in a retail environment, in other embodiments, a listenability service 410 may operate independently of a retail environment. In some such embodiments, the listenability service 410 may communicate with a user computing device 102 without the presence of a retail server, or may communicate with another server responsible for providing front-end communication with the user computing device 102. In other embodiments, the retail server 404 may include or implement a listenability service, as described herein, such that a separate listenability service 410 may not be present in certain embodiments.

Figure 5:
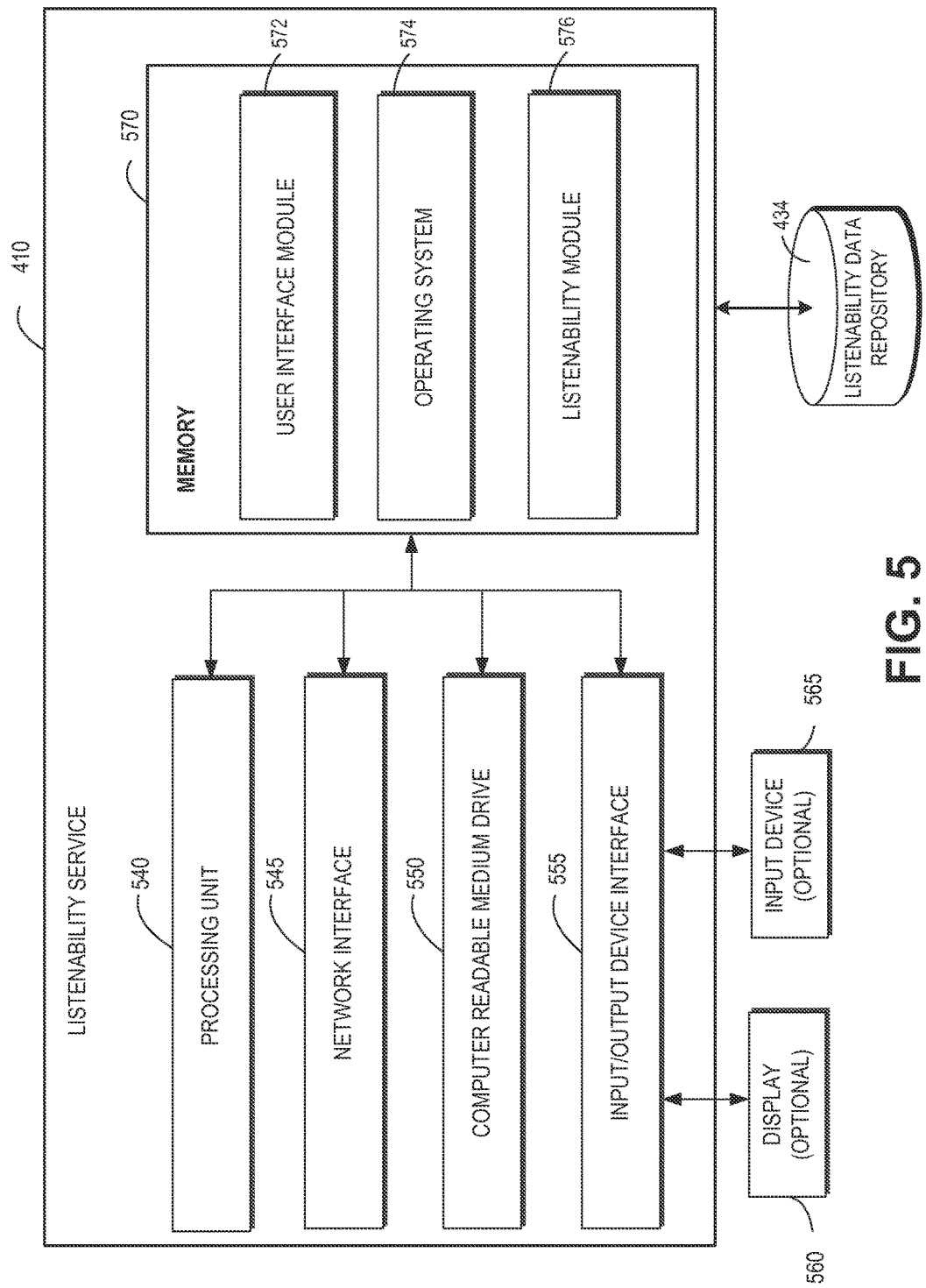
FIG. 5 depicts a general architecture of an example computing device providing a listenability service for automatically analyzing audio for listenability.

FIG. 5 depicts a general architecture of a computing system (referenced as listenability service 410) that automatically analyzes audio recordings and/or provides recommendations of audio data items. The general architecture of the listenability service 410 depicted in FIG. 5 includes an arrangement of computer hardware and software components that may be used to implement aspects of the present disclosure. The listenability service 410 may include many more (or fewer) elements than those shown in FIG. 5. It is not necessary, however, that all of these generally conventional elements be shown in order to provide an enabling disclosure. As illustrated, the listenability service 410 includes a processing unit 540, a network interface 545, a computer readable medium drive 550, an input/output device interface 555, a display 560, and an input device 565, all of which may communicate with one another by way of a communication bus. The network interface 545 may provide connectivity to one or more networks or computing systems. The processing unit 540 may thus receive information and instructions from other computing systems or services via the network 408. The processing unit 540 may also communicate to and from memory 570 and further provide output information for an optional display 560 via the input/output device interface 555. The input/output device interface 555 may also accept input from the optional input device 565, such as a keyboard, mouse, digital pen, microphone, touch screen, gesture recognition system, voice recognition system, gamepad, accelerometer, gyroscope, or other input device.

The memory 570 may contain computer program instructions (grouped as modules or components in some embodiments) that the processing unit 540 executes in order to implement one or more embodiments. The memory 570 generally includes RAM, ROM and/or other persistent, auxiliary or non-transitory computer-readable media. The memory 570 may store an operating system 574 that provides computer program instructions for use by the processing unit 540 in the general administration and operation of the listenability service 410. The memory 570 may further include computer program instructions and other information for implementing aspects of the present disclosure. For example, in one embodiment, the memory 570 includes a user interface module 572 that generates user interfaces (and/or instructions therefor) for display upon a computing device, e.g., via a navigation interface such as a browser or application installed on the computing device. In addition, memory 570 may include or communicate with listenability data repository 534 and/or one or more other data stores, as discussed above with reference to FIG. 4.

Listenability module 576 may analyze audio recordings, generate variability levels and/or scores, and/or determine narrator recommendations. While listenability module 576 is shown in FIG. 5 as part of the listenability service 410, in other embodiments, all or a portion of listenability module 576 may be implemented by the retail server 110 and/or another computing device. In some embodiments, the retail server 404 may include several components that operate similarly to the components illustrated as part of the listenability service 410, including a user interface module, a listenability module, processing unit, computer readable medium drive, etc. In such embodiments, the retail server 404 may communicate with a listenability data store, such as listenability data repository 434, and the listenability service 410 may not be needed in certain embodiments. Further, although certain examples are illustrated herein in the context of a retail server 404, this is not a limitation on the systems and methods described herein. It will also be appreciated that, in some embodiments, a user device may implement functionality that is otherwise described herein as being implemented by the elements and/or modules of the listenability service 410. For example, the user computing device 402 may implement natively, and/or receive from the retailer server 404 and/or listenability service 410 via the network 408, code modules or other instructions that are executed by the user computing device 402 to implement various aspects of the present disclosure.

Figure 6:
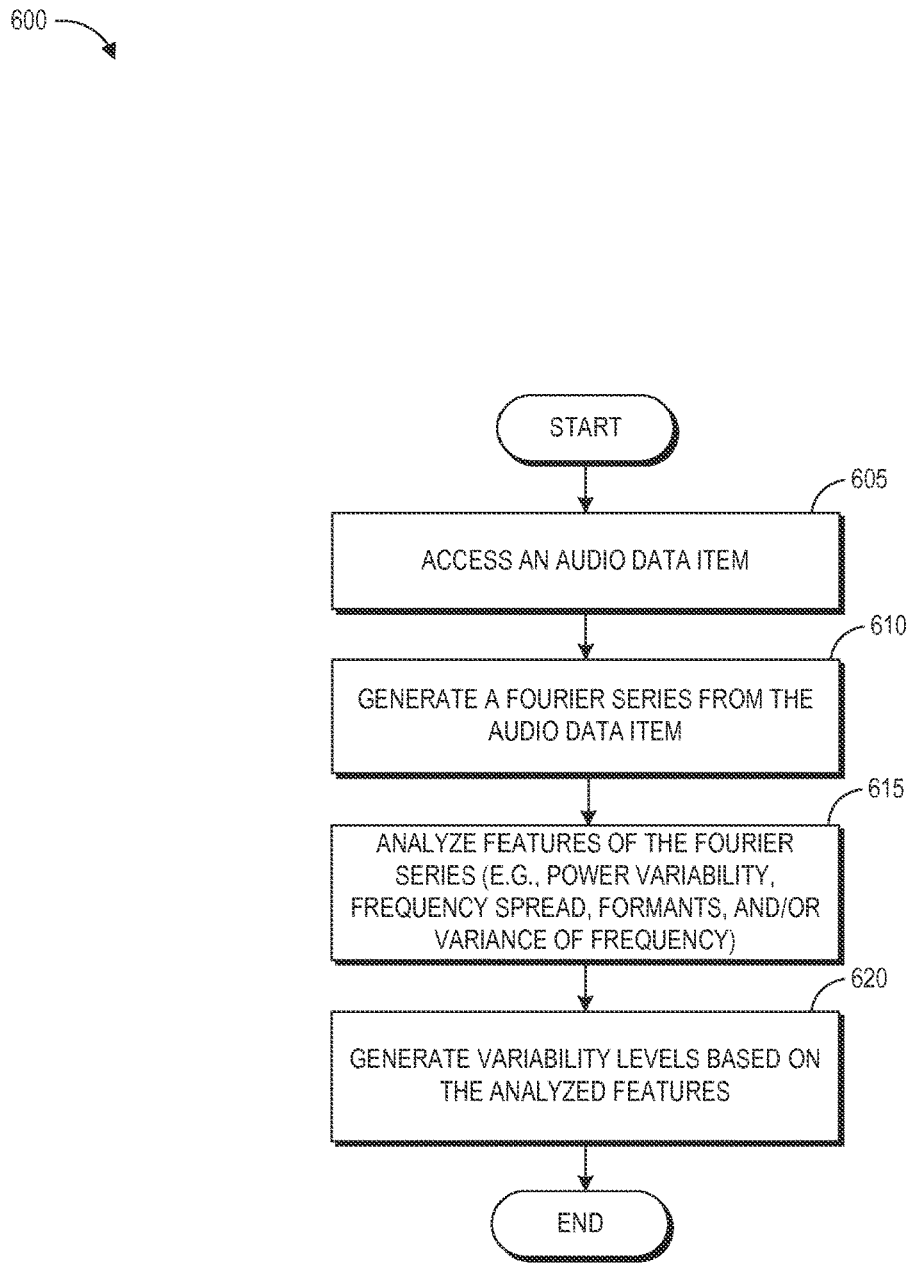
FIG. 6 is a flow diagram depicting an illustrative method for determining variability levels based on features of audio data.

FIG. 6 is a flow diagram depicting an illustrative method 600 for determining variability levels and/or scores based on features of audio data. While illustrative method 600 will be described below as being implemented by the components of listenability service 410, such as the listenability module 576, in other embodiments, a similar method may be implemented by the retail server 404, such as by including listenability module 576, or other computing system responsible for providing front-end communication with a user computing device. As discussed above, illustrative method 600 may be implemented entirely by a user device, such as user computing device 102, in some embodiments.

The illustrative method 600 begins at block 605, where listenability service 410 accesses an audio data item. In some embodiments, an audio data item may correspond to a sample narration audio recording, a sample of an audiobook, and/or a complete audiobook. The audio data item may be in a digital media format, such as, but not limited to, MP3, MPEG, WAV, MKV, WMV, AVI, MP4, or a proprietary media format. In some embodiments, listenability service 410 may access the audio data item from the audio data repository 412.

At block 610, listenability service 410 generates a Fourier series from the audio data item. In some embodiments, a Fourier series may be generated by listenability service 410 using a Fourier transform algorithm, such as, but not limited to, a Discrete Fourier Transform and/or Fast Fourier Transform algorithm. Listenability service 410 generates the Fourier series by accessing the digitized analog waveform of the audio data item and breaking down the signal into its component sine and cosine waves. Various methods of performing Fourier transforms of audio data, including Discrete Fourier Transforms and Fast Fourier Transforms, are known in the art and need not be described in detail herein. The Fourier series may be further analyzed by listenability service 410, which is described herein.

In some embodiments, listenability service 410 may generate alternate data representations of the audio data item. For example, listenability service 410 may convert the audio signal of the audio data item using a discrete cosine transform, linear prediction model, vector quantization, Gaussian mixture model, inverse filtering, closed-phase covariance analysis, parametric glottal flow model parameters, residual phase, cepstral coefficients and/or higher-order statistics, first- and/or second-order time derivative estimates, time frequency principal components, data-driven temporal filters, temporal discrete cosine transform, frequency modulation methods, and/or some combination thereof.

Alternatively or additionally, listenability service 410 may determine and/or access metadata associated with the audio data item. For example, textual content may be determined and/or retrieved for an audio data item. In some embodiments, the words for given portions of audio content (such as audio content of an audiobook) may be determined based at least in part on a corresponding or related item of textual content (such as textual content of an electronic book version of the same underlying book). An item of audio content and a corresponding item of associated textual content may be synchronized with one another. For example, the listenability service 410 may be provided with and/or access content synchronization information that maps one or more words in the item of associated textual content with a position of an identical word or words in the item of audio content (e.g., the identical word or words that are spoken, sung, recited, etc. in the item of audio content). In some embodiments, the synchronization information may indicate time positions and/or data locations within associated audio content that correspond to word or other positions within the textual content. More information regarding synchronizing an item of audio content with an item of associated textual content, as well as content synchronization information that may be stored in association with the synchronization, may be found in U.S. patent application Ser. No. 12/273,473, filed Nov. 18, 2008, entitled "SYNCHRONIZATION OF DIGITAL CONTENT." In some embodiments, textual content representing words spoken in various types of audio content may be determined dynamically using speech recognition and/or other known methods.

At block 615, listenability service 410 analyzes features of the Fourier series and/or other audio representation data. In some embodiments, analyzing shorter segments, clips, and/or portions of audio data may be preferred to reduce computer processing. For example, a producer and/or content creator may submit a short sample of audio narration or an audiobook may be sampled, such as determining a thirty-second clip of an audiobook. Various features of the Fourier series are discussed herein, such as power, tempo, frequency, identification of formants, and complexity, among others. In some embodiments, other voice features that may be determined from the audio data and/or Fourier series may include determining the variability of pauses and/or the range of overtones. In some embodiments, the variability of an audio feature may predict and/or be indicative of the quality of the audio narration. For example, high variability of power and/or frequency of the audio data may indicate and/or convey emotion of the narrator, which may be engaging to the listener.

In some embodiments, listenability service 410 may determine power from the power spectral density of the Fourier series and/or other audio representation data. As described herein, the power from the power spectral density of the Fourier series can be used to generate a power variability level that can indicate a change in power over time. A Fourier series with high power variability level may predict how well listeners may enjoy the corresponding audio recording. For example, some listeners may prefer narrators with velvety voices, which include more overtones. An overtone may be extra sound frequencies overlaid onto the main and/or primary sound. In contrast, an agitated voice may have more power within a particular frequency range, such as six to seven kHz, and a less overall range. Furthermore, an example narrator with an agitated voice may include higher pitched, loud voice, no breathiness, a lack of rising pitch for questions or lowering of pitch for assertions, and/or some combination thereof. Thus, the variability of the power spectrum of an audio sample may be useful for predicting narration quality.

In some embodiments, listenability service 410 may determine the tempo and/or speed of a voice from the audio data. As described herein, the tempo and/or speed of a voice can be used to determine a tempo variability level that can indicate a change in tempo and/or speed of a voice over time. The tempo and/or speed of a voice may refer to the number of speech units and/or words within a predefined and/or configurable period of time from a voice recording. In some embodiments, listenability service 410 may determine tempo and/or speed from the Fourier series. For example, a determination of tempo and/or speed may be based on detection of vowels, consonants, harmonic and/or consonant vowels from the Fourier series, to generate an approximation of a syllable rate of the audio recording. Alternatively or additionally, listenability service 410 may determine tempo and/or speed from metadata, such as textual content, associated with the audio data item. For example, a rate at which words are spoken may be determined from associated textual content that includes time positions synchronized with the audio recording. Listenability service 410 may determine words per minute spoken by a narrator for one or more time segments of an audio recording. Thus, the tempo and/or speed of a voice may be sampled and/or determined multiple times from the same audio recording to determine one or more changes in speed and/or tempo. For example, a speaker and/or narrator from the audio recording may vary the tempo of their speech with a range of slow speech, such as 120 or 130 words per minute, to faster speech, such as 160 or 170 words per minute.

In some embodiments, listenability service 410 may determine formants from the Fourier series and/or other audio representation data. In some embodiments, a "formant" may refer to a concentration of acoustic energy around a particular frequency. Similar to the other audio features that may be analyzed by listenability service 410 for variability, the range and/or variability of formants within audio data may be determined by listenability service 410.

In some embodiments, listenability service 410 may determine frequencies from the Fourier series and/or other audio representation data. Listenability service 410 may determine the frequency spread of a voice from the Fourier series. For example, the Fourier series data may include the frequencies that make up the audio recording. Listenability service 410 may access and/or determine the frequency of a voice at time intervals of the audio recording, which may indicate low and high frequencies for the audio recording and/or for intervals of the audio recording. Thus, listenability service 410 may determine the variability of frequencies and/or frequency spread from the Fourier series.

In some embodiments, listenability service 410 may use one or more machine learning techniques to analyze features of the Fourier series and/or other audio representation data. For example, in a supervised and/or semi-supervised context, sample audio recordings from multiple narrators may be used as training data that may be reviewed by a human to verify detection of audio features described herein to generate a custom machine learning algorithm that identifies one or more audio features, variability levels, and/or an overall variability level. In some embodiments, audio feature detection may be accomplished via one or more techniques and/or algorithms in artificial intelligence, clustering, statistical and/or probabilistic machine learning, Markov models, unsupervised learning, supervised learning, semi-supervised learning, clustering, and/or some combination thereof.

At block 620, listenability service 410 generates variability levels based on the analyzed features. As described herein, a predicted engagement, naturalness, or persuasiveness of speech may be based on variability of one or more features of the Fourier series and/or audio recording. For example, listenability service 410 may generate a variability level and/or score associated with the power variability of the Fourier series. In another example, listenability service 410 may generate a variability level and/or score associated with the tempo and/or speed of a voice. Normal human speech may include pronunciation of words at highly variable speeds. For example, an engaging narrator may slow down for emphasis and/or speed up for excitement. Thus, variability of tempo and/or speed may be computed from the variability of the word time segments and/or series associated with the audio recording. In some embodiments, an overall variability level and/or score may be determined from the Fourier series. Alternatively or additionally, listenability service 410 may generate a combined variability level based on the individual variability levels of respective features of the Fourier series and/or audio data. For example, an overall variability level and/or score may be between 0 and 1, which may indicate a predicted level of engagement ranging from least engaged to most engaged, respectively. Thus, audio data items with variability levels within a particular threshold may be flagged as potential poor narrator recordings or as recommended narrators and/or recordings, which is described in further detail herein.

In some embodiments, variability levels and/or scores may be generated using one or more machine learning techniques described herein. For example, lightly supervised and/or semi-supervised training may be used where a human reviewer assigns scores to the sample audio recordings for individual features of the audio recordings. Additionally or alternatively, a human reviewer may assign an overall score to sample audio recordings that may be used by listenability service 410 to generate a custom machine learning algorithm that generates an overall variability level and/or score for audio data items. Furthermore, listenability service 410 may implement a feedback mechanism to improve the machine learning algorithm over time by updating a custom algorithm based on user feedback and/or ratings of audiobooks.

In some embodiments, a feature score may be generated for features such as, but not limited to, gender and/or accent. For example, a predicted likelihood of the narrator's gender may be based on an automated analysis of features of an audio recording, such as detected pitch within the audio recording. As described herein, one or more machine learning techniques may be used to train a gender classifier based at least on the range of pitches from an audio recording. In some embodiments, a feature score for a predicted accent of the narrator for an audio recording may be determined based on distinct and/or particular phonetic patterns and/or phonemes within the audio recordings. Listenability service 410 may use the machine learning techniques described herein to train classifiers of accents based on detected phonetic patterns and/or particular phonemes.

Figure 7:
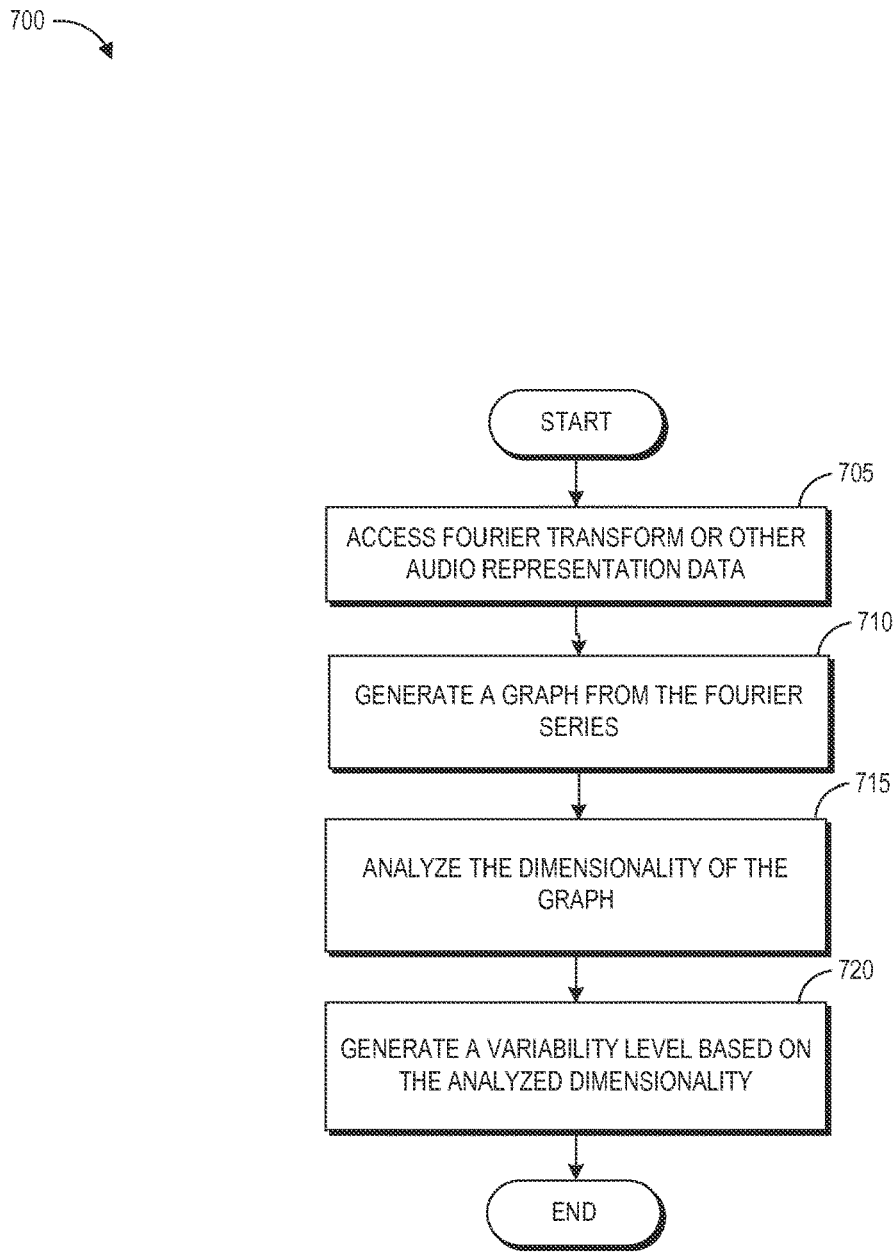
FIG. 7 is a flow diagram depicting an illustrative method for determining a variability level based on dimensionality.

FIG. 7 is a flow diagram depicting an illustrative method 700 for determining a variability level based on a dimensionality of power, tempo, frequency, or and/or other features from audio data. In some embodiments, some of the blocks of illustrative method 700 may be similar to and/or implemented at blocks 615 or 620 of FIG. 6 described above. For example, dimensionality may be one of the features determined by listenability service 410 at block 615. While illustrative method 700 will be described below as being implemented by the components of listenability service 410, such as the listenability module 576, in other embodiments, a similar method may be implemented by the retail server 404, such as by including listenability module 576, or other computing system responsible for providing front-end communication with a user computing device. As discussed above, illustrative method 700 may be implemented entirely by a user device, such as user computing device 102, in some embodiments.

The illustrative method 700 begins at block 705, where listenability service 410 accesses the Fourier series or other audio representation data. For example, the accessed Fourier series may be similar to or the same Fourier series generated by listenability service 410 at block 610 of FIG. 6. In some embodiments, listenability service 410 accesses and/or retrieves the Fourier series from the listenability data repository 434.

At block 710, listenability service 410 generates a graph from the accessed Fourier series. In some embodiments, listenability service 410 generates a graph of the accessed Fourier series by plotting time, frequency, and/or power spectra from the Fourier series function. An example graph may include an axis for time and an axis for frequency. In some embodiments, the graph of the Fourier series may include indicators and/or an axis for power spectra. A "graph" generated by listenability service 410 may refer to determining data and/or values of time, frequency, and/or power spectra from the Fourier series and may not require generating a visualization of the graph.

At block 715, listenability service 410 analyzes the dimensionality and/or complexity of the graph. "Dimensionality" or a "fractal dimension" may refer to a ratio providing a statistical index of complexity comparing how detail in a graph, shape, and/or pattern changes with the scale at which it is measured. For example, a line may have an integer dimension of one, a plane may have an integer dimension of two, and a cube may have an integer dimension of three. Well-known examples of fractal dimensions include a Koch curve, which has a fractal dimension of about 1.26, a Sierpinski or Pascal triangle, which has a fractal dimension of about 1.5, or a Sierpinski carpet, which has a fractal dimension of about 1.9. Listenability service 410 may use one or more algorithms to analyze the dimensionality of a graph based on, for example, the values for time, frequency, and/or power. For example, listenability service 410 may use a box counting method to analyze the graph. In some embodiments, an example box counting method may include a recursive algorithm for the following: cover the graph with grids of boxes (2 dimensions), cubes (3 dimensions), etc. of different sizes, compare the grid sizes and the number of squares containing at least a part of the plotted graph, and determine the dimension based on the ratio of grid sizes to number of grids containing the plotted graph. Thus, the box counting method may be used by listenability service 410 to determine the variability of the Fourier series. Additionally or alternatively, other fractal dimension analysis techniques may be used, such as, but not limited to, pair-counting, alternative box-counting algorithms, a fast fractal dimension algorithm, a tug-of-war algorithm, or some combination thereof.

At block 720, listenability service 410 generates a variability/dimensionality level and/or score based on the analyzed dimensionality of the graph. In some embodiments, the variability levels of audio quality markers may correspond to the calculated dimensionality of the graph. For example, a dimensionality level for the power spectrum of an audio data item may correspond to the dimensionality value computed by the box counting method. Example dimensionality of graphical power spectrums of audio data items include values such as 1.42 or 1.78 for two dimensions, or 2.51 or 2.82 for three dimensions. Audio data items with higher dimensionality levels and/or scores may have greater variability of frequencies and/or power spectra over time, which may indicate a rich, ever-varying narration style. Thus, an audio data item with a dimensionality of 1.78 may have a greater predicted complexity than an audio data item with a dimensionality of 1.42. In other words, the dimensionality of power, frequency, tempo, and/or other feature of the Fourier series may be used as a proxy of complexity to predict how engaging an audio recording may be to a human listener. In some embodiments, listenability service 410 may generate a dimensionality level in addition to the variability levels discussed with reference to FIG. 6 and/or the dimensionality level may be combined with other variability levels to generate an overall variability level and/or score. It will be appreciated that the one or more machine learning techniques described herein may also be used to analyze and/or determine dimensionality as a predictor for "good" narration patterns, which may be based in part on observed listener preferences.

Figure 8:
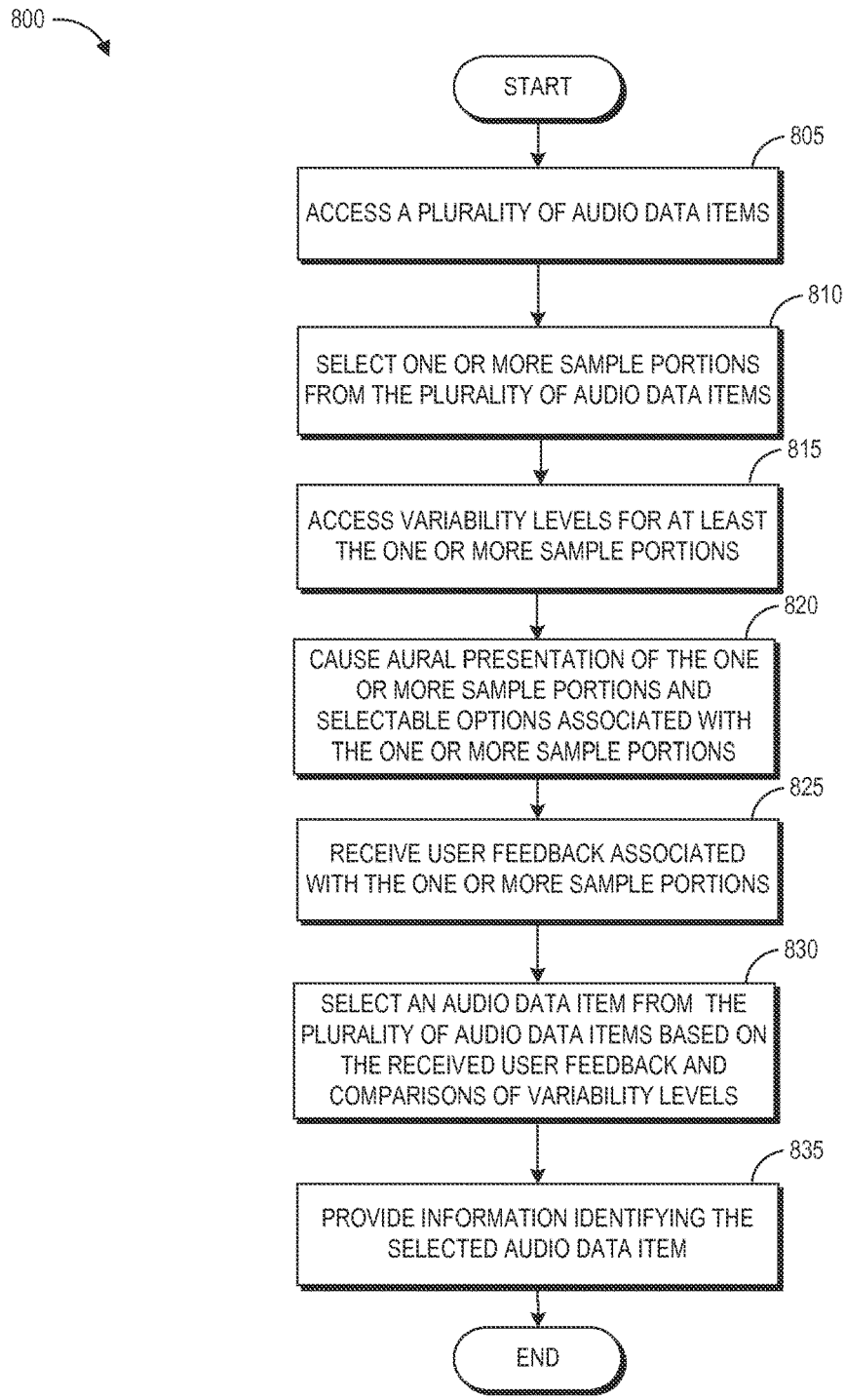
FIG. 8 is a flow diagram depicting an illustrative method for determining an audio recommendation based on user selections of audio data items and associated variability levels.

FIG. 8 is a flow diagram depicting an illustrative method 800 for determining an audio recommendation based on user selections of representative audio data items and associated variability levels. While illustrative method 800 will be described below as being implemented by the components of listenability service 410, such as the listenability module 576, in other embodiments, a similar method may be implemented by the retail server 404, such as by including listenability module 576, or other computing system responsible for providing front-end communication with a user computing device. As discussed above, illustrative method 800 may be implemented entirely by a user device, such as user computing device 102, in some embodiments.

The illustrative method 800 begins at block 805, where listenability service 410 accesses a plurality of audio data items and/or audio recordings. For example, listenability service 410 may access the audio data items, such as audiobooks, from the audio data repository 412. At block 810, listenability service 410 selects one more sample portions from the plurality of audio data items. For example, a thirty-second portion may be selected and/or accessed from an audiobook. In some embodiments, selection of sample portions from the audio data items may be optional and listenability service 410 may process the entire audio recording.

At block 815, listenability service 410 accesses variability levels for at least the sample portions. As described herein, the accessed variability levels may have been computed by listenability service 410 using the techniques and/or processes described with respect to FIGS. 6 and/or 7. For example, listenability service 410 may access variability levels associated with power, frequency, tempo, complexity and/or dimensionality, other features of the sampled audio recording (such as gender or accent), and/or some combination thereof.

In some embodiments, listenability service 410 selects the plurality audio data items or the sample portions based on a predetermined list and/or a collection associated with variability levels. For example, a human reviewer may select a collection of representative or exemplary audio data items and/or sample portions based on variability levels, which may be associated with one of power, frequency, tempo, complexity and/or dimensionality, among other features. In other embodiments, the selected sample portions may be selected without relying on input from a human reviewer, such as by the listenability service 410 identifying samples that are representative of given variability levels and/or feature scores, as described above.

At block 820, listenability service 410 causes presentation of a user interface that includes one or more user interface elements. An example user interface with user interface elements includes user interface 200 of FIGS. 2A and 2B. In the example, user interface 200 includes user interface elements for causing aural presentation of the sample portions of audio data (e.g., playback control areas 212A and/or 212B) and/or user interface elements for receiving user feedback associated with the sample portions of audio data (e.g., user interface elements 214A and/or 214B).

At block 825, listenability service 410 receives user feedback associated with the one or more sample portions. For example, listenability service 410 may receive user input data indicating that a user has selected an option indicating their feedback and/or preference for a sample portion of audio data. In some embodiments, presentation of user interface at block 820 and/or receiving user feedback at block 825 by listenability service 410 may occur in an iterative manner. For example, the sequential presentation of sample portions at block 820, which may be selected by a user for aural presentation, may be based on the received feedback indicating the one or more previously selected sample portions at block 825. For example, as described herein, if a user selects a sample portion with a high power variability or a power variability level within a certain range, then subsequent sample portions may be selected by listenability service 410 based on comparing the power variability level of the previously selected sample portion with other sample portions to be presented in the user interface. In this manner, the sequential received user feedback may be cumulative and/or affect subsequently presented sample portions by listenability service 410. In some embodiments, blocks 820 and 825 may "loop" and/or process continuously until a predetermined stop and/or end condition is reached, such as a predetermined number of sample portions and/or set of features to present to a user. Further example continuous presentations of user interfaces and/or receiving of user input are described in further detail herein with respect to FIGS. 2A-2C and 3A-3B.

At block 830, listenability service selects an audio data item from the plurality of audio data items based on the received user feedback and comparisons of variability levels. As described herein, user feedback of sample portions may indicate preferred sample portions and listenability service 410 may access one or more variability levels associated with the sample portions. Listenability service 410 may select an audio data item from the plurality of audio data items by comparing the preferred variability levels (of power, tempo, frequency, among other features) with one or more audio data items from the plurality of items. In some embodiments, a listenability service 410 may select an audio data item when its respective one or more variability levels are within a threshold of the preferred variability levels. For example, as described with respect to FIGS. 2A-2C, a user may select sample portions associated with a female voice narrator, a voice narrator with high tempo variability and/or another feature, and listenability service 410 may select an audio recording based on similar variability levels and/or feature scores indicating a female voice and high tempo variability. In some embodiments, listenability service 410 may use one or more machine learning and/or clustering techniques described herein to compare, select, and/or recommend an audio data item from the plurality of audio data items. For example, clustering techniques may be used to determine a recommended audio data item with similar variability levels as compared to the variability levels of the selected sample portions.

In some embodiments, listenability service 410 may use a self-adjusting Bayesian algorithm to select an audio recording based on the user feedback and accessed variability levels. A Bayesian network may be a directed acyclic graph (DAG) in which the nodes represent the variables in the domain and the edges correspond to direct probabilistic dependencies between them. For example, the user feedback may indicate voices that customers think they'll like, and listenability service 410 may access user data that indicates voices that have been positively rated by respective users following their listening to full audiobooks. For each customer rating of a narration, listenability service 410 may adjust the "narrator preference" scores and/or variability weights for that customer and/or user. Example DAGs that may be used by a self-adjusting Bayesian algorithm include decision tree FIGS. 3A and 3B where the edges are directed. The DAG may be updated by the self-adjusting Bayesian algorithm where features of "liked" or purchased audiobooks may reinforce the probabilistic dependencies and/or edges of the DAG corresponding to particular variability levels and/or features. Thus, the recommendations provided to particular users may update and/or improve over time based on feedback from those particular users.

At block 835, listenability service 410 provides information identifying the selected audio data item and/or narrator associated with the audio data item. For example, listenability service 410 may provide data identifying the selected audio data item to the retail server 404 and/or user computing device 402. An example user interface presentation of one or more recommended audio data items and/or a recommended narrator may correspond to user interface 200 of FIG. 2C.

Figure 9:
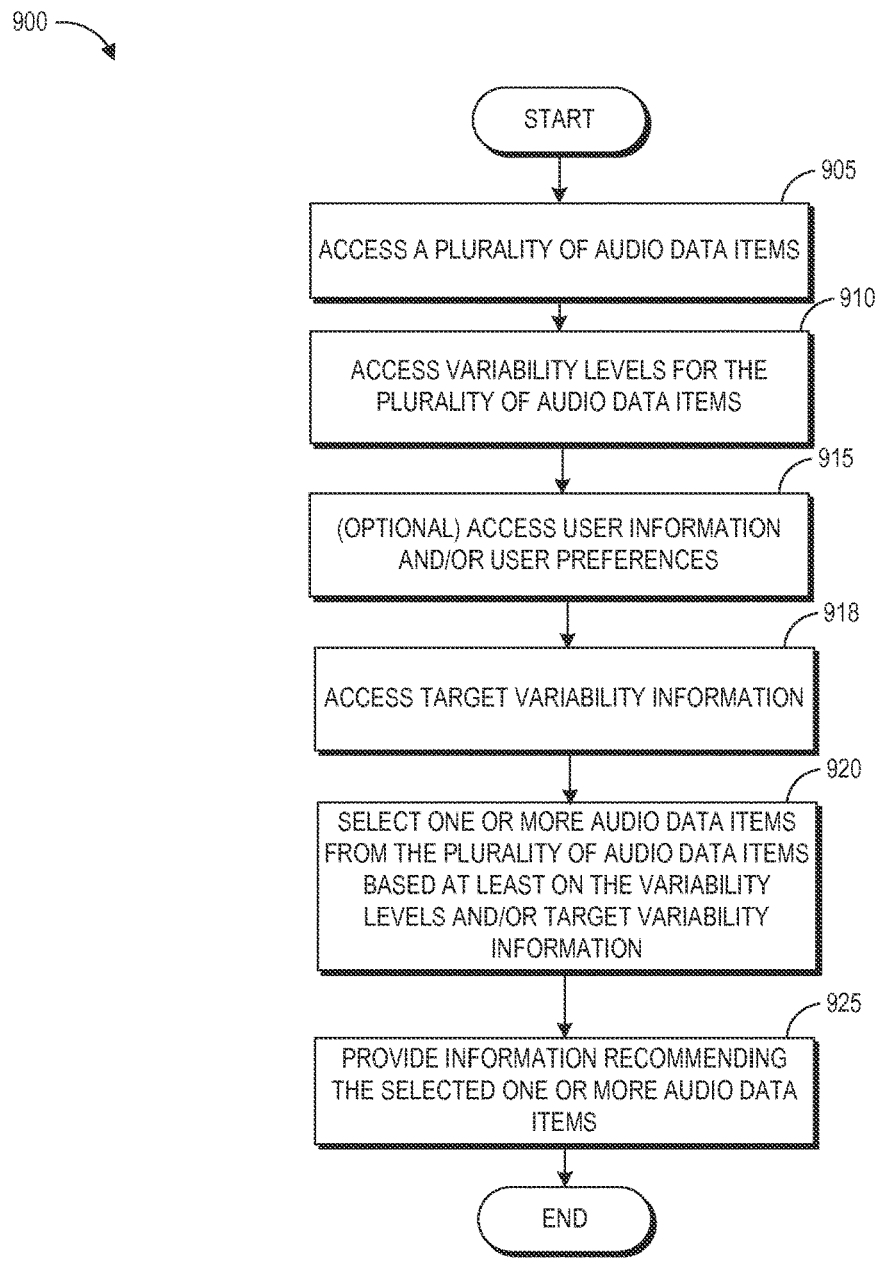
FIG. 9 is a flow diagram depicting an illustrative method for selecting, categorizing, grouping, and/or sorting audio data items based variability levels.

FIG. 9 is a flow diagram depicting an illustrative method for determining an audio recommendation based on user selections of representative audio data items and associated variability levels. While illustrative method 900 will be described below as being implemented by the components of listenability service 410, such as the listenability module 576, in other embodiments, a similar method may be implemented by the retail server 404, such as by including listenability module 576, or other computing system responsible for providing front-end communication with a user computing device. As discussed above, illustrative method 900 may be implemented entirely by a user device, such as user computing device 102, in some embodiments.

The illustrative method 900 begins at block 905, where listenability service 410 accesses a plurality of audio data items and/or audio recordings. Listenability service 410 may access some and/or all of the audio data items in the audio data repository 412. In some embodiments, aspects of block 905 may be similar to block 805 of FIG. 8. Next, at block 910, listenability service 410 may access one or more variability levels for the accessed plurality of audio data items. For example, an overall variability level and/or score may be accessed for the plurality of audio data items. Alternatively or additionally, listenability service 410 may access individual variability levels and/or audio features for respective audio data items of the plurality of audio data items. In some embodiments, aspects of block 910 may be similar to block 815 of FIG. 8.

At block 915, listenability service 410 optionally accesses user information and/or user preferences. For example, listenability service 410 may access previous audiobooks purchased and/or listened to by a user. Other example user data includes user rating data for narration audio recordings. For example, audio data repository 412 may include a library of narration audio recordings. In the example, users may rate some of the narration audio recordings in a rating system. Thus, listenability service 410 may retrieve user rating data that indicates which narration audio recordings have been positively rated by users. Example positive ratings of narration audio recordings include four or five "stars" out of a five-star system, where the stars or other rating data may be stored as numbers in a data store. An average numeric rating of a given narration audio recording may be determined and compared against a threshold that indicates a lower bound for the user rating(s) to be considered positive. In other embodiments, users may express a positive or negative rating in binary terms, such as by selecting "yes" or "no" to a question regarding whether the user likes the narration audio recording and/or selecting a single user interface element to express approval or praise for a given narration audio recording. Other example user data that may be accessed by listenability service 410 includes narrator preferences, such as the user feedback described with respect to FIGS. 2A-2C. Thus, some embodiments of listenability service 410 may include a personalized recommendation service to provide recommendations for a particular user. In some embodiments, block 915 may be optional. For example, a method similar to illustrative method 900 may be implemented to recommend audio books that are likely to be considered to include "good" or enjoyable narration without reference to the identity of the specific intended listener. In such cases, block 915 may be replaced by a block in which criteria are retrieved indicating various ideal levels, scores and/or value ranges that have been determined to be most often desired by the average user or the largest number of users, or which may be preset by an operator of the listenability service 410. Thus, some embodiments of listenability service 410 may include a generalized recommendation service to provide recommendations without respect to a particular user.

At block 918, listenability service 410 accesses and/or retrieves target variability information. For example, listenability service 410 may retrieve target variability information and/or data from listenability data repository 434. In some embodiments, target variability information may include predetermined variability patterns, thresholds, and/or ranges, as described herein. For example, "good" audio narrations (such as narrations that are rated highly by consumers and/or an operator of the listenability service) may have been analyzed manually or by listenability service 410 to determine the target variability information that indicate a target variability patterns, thresholds, and/or ranges of power, frequency, tempo, and/or other features. Additionally or alternatively, target variability information may be based at least in part on user preferences and/or user history data, as described herein.

At block 920, listenability service 410 selects one or more audio data items from the plurality of audio data items based at least on the accessed variability levels and the retrieved target variability information. Listenability service 410 may select one or more audio data items, such as audiobooks, based on comparing the accessed variability levels (for power, frequency, tempo, dimensionality, and/or another feature) of the one or more audio data items with the retrieved target variability information. For example, one or more variability levels for power, frequency, tempo, dimensionality, and/or another feature may be compared to the retrieved target variability information of a pattern of one or more of power, frequency, tempo, dimensionality, and/or another feature determined from "good" audio narrations or narrations preferred by a given user. In some embodiments, listenability service 410 performs a comparison of overall variability levels of respective audio data items being above a particular threshold or within a particular range. Alternatively or additionally, one or more audio recordings may be selected based on respective variability levels, such as variability levels for power, frequency, or tempo, being above predetermined respective variability thresholds for power, frequency, or tempo, among other features. A target variability threshold includes, but is not limited to, a particular value for the variability level of power, frequency, or tempo, among other features. For example, listenability service 410 may select audio recordings based on an overall variability level above 0.9 or a power variability level of 0.84. The variability threshold may be determined in a number of ways, depending on the embodiment. In some embodiments, the variability threshold may be set based on determined variability levels for audio recordings that have been positively rated by one or more users. For example, the variability threshold used to determine a recommendation in a given instance may be set to be equal to a variability level (such as a power variability level, frequency variability level, or tempo variability level) that was determined for a sample audio recording that has been positively rated by a given user for whom the recommendation is being generated and/or which has been positively rated by a number of users. Target variability information may include a target variability threshold, but may alternatively or additionally include other types of information. In some embodiments, target variability information may include a range of variability levels and/or two or more target variability thresholds for different features such as power, frequency, or tempo, among others. In some embodiments, automatic selection of new audiobooks by listenability service 410 based at least on variability levels may be advantageous because of the potentially large size of the electronic catalog and difficulty in having one or more humans listen to the entire electronic catalog. Furthermore, such automatic selection may significantly increase the speed with which new audio data items may be added to the electronic catalog and/or added to a group of items that are considered for automated recommendation to users by minimizing or removing any need for a human listener to screen or otherwise perform a quality check with respect to incoming audio data items.

In some embodiments, aspects of block 920, such as the selection of an audio data item, may be similar to block 830 of FIG. 8. For example, an audio recording recommendation may be selected based at least on comparing variability levels (for power, frequency, tempo, dimensionality, and/or another feature) of an audio recording with audio recordings that have previously been listened to and/or purchased by a particular user. In some embodiments, the target variability information may include the respective variability thresholds from audio recordings from user data, such as previous listening or purchasing history. Additionally or alternatively, the plurality of audio data items may be categorized and/or sorted based on the one or more variability levels. For example, a user searching for "romance" audiobooks (which may include searching among a number of items that are new or have few customer ratings) may be presented with matching search results that are ordered by their respective variability levels (where search results with the highest variability levels may be presented first).

In some embodiments, listenability service 410 may group, cluster, or determine subsets of audio recordings and/or narrators based on similar variability levels and/or comparing variability levels. For example, listenability service 410 may group narrators and/or select subsets of narrators with similar variability thresholds of power, frequency, tempo, dimensionality, and/or another feature. In some embodiments, the groupings and/or clusters of narrators may be determined based on one or more machine learning techniques. Furthermore, the generated clusters of narrators may be stored in the listenability data repository 434. Techniques for grouping narrators may be implemented by listenability service 410, such as in combination with the some or all blocks of illustrative method 800 of FIG. 8 or with respect to user interface 200 of FIGS. 2A and 2B. For example, groupings of narrators may be presented to a user based on user selections of audio recordings from user interface 200 of FIG. 2A or 2B.

At block 925, listenability service 410 provides information recommending the selected audio data item and/or narrator associated with the audio data item. For example, listenability service 410 may provide data identifying the selected audio data item(s) to the retail server 404 and/or user computing device 402. An example user interface presentation of one or more recommended audio data items and/or a recommended narrator may correspond to user interface 100 of FIG. 1. In some embodiments, information identifying the selected audio data item(s) and/or the selected data item(s) is stored in a computer-readable, non-transitory storage medium such as listenability data repository 434. The stored information and/or items may be accessed at a later time to provide a recommendation, as described herein.

While reference is frequently made herein to a retail environment of audiobooks, it will be appreciated that the systems and methods disclosed herein may be used in other environments. For example, systems and methods described herein may be used to provide tools for content creators and/or reviewers of content creators. As described herein, content producers may submit audio clips which may be analyzed by listenability service 410, such as by using methods similar to the illustrative methods described with respect to FIGS. 6 and 7, to automatically score and/or rank the audio clips and/or to provide feedback to the content producers. For example, a content producer may use the "Narrator Finder" of FIGS. 2A-2C to identify a narrator who would be appropriate to record a given audiobook that has not yet been produced.

In some embodiments, listenability service 410 may implement one or more preliminary and/or listenability checks for processing audio data items for generating automated recommendations. For example, listenability service 410 may process audio recordings and flag respective audio recordings that are too quiet, too loud, have background noise, and/or have large volume spikes in the audio recordings. These automated preliminary checks may be combined with the automated audio analysis described herein, such as the illustrative methods described with respect to FIG. 6, 7, 8, or 9.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    determining, for each narration audio recording of a plurality of narration audio recordings, a variability level of at least a portion of audio data of the narration audio recording, wherein the variability level is determined with respect to one of power, frequency, or tempo of the audio data;
    causing presentation of a user interface to provide an audio recording recommendation or a narrator recommendation based at least on user input, the user interface comprising:
        a first graphical user interface element for a first narrator, the first graphical user interface element selectable to cause presentation of audio data from a first sample portion of the first narrator; and
        a second graphical user interface element for a second narrator, the second graphical user interface element selectable to cause presentation of audio data from a second sample portion of the second narrator;
    receiving, via the user interface, user input as a user selection of the first narrator instead of the second narrator;
    determining target variability information from the first sample portion for the first narrator instead of the second sample portion for the second narrator, wherein the target variability information indicates a target range of variability levels with respect to the one of power, frequency, or tempo;
    identifying, from the plurality of narration audio recordings, a first narration audio recording based at least on comparing the target range of variability levels of at least the first sample portion to a first variability level of audio data of the first narration audio recording, wherein comparing the target range of variability levels to the first variability level comprises determining that the first variability level is within the target range of variability levels, wherein the first narration audio recording comprises audio for a third narrator different than the first narrator and the second narrator; and
    in response to determining that the first variability level of the audio data of the first narration audio recording is within the target range of variability levels of the target variability information,
        causing presentation, in the user interface, of information identifying the first narration audio recording or the third narrator of the first narration audio recording as a recommendation.

2. The computer-implemented method of claim 1, wherein determining the variability level of the at least the portion of audio data of the narration audio recording further comprises:
    identifying power from a Fourier series from the at least the portion of audio data of the narration audio recording;
    determining a dimensionality score from the power from the Fourier series using dimension analysis; and
    assigning the dimensionality score as the variability level.

3. The computer-implemented method of claim 2, wherein the dimension analysis comprises at least one of a box counting algorithm, a pair-counting algorithm, a fast fractal dimension algorithm, or a tug-of-war algorithm.

4. The computer-implemented method of claim 3, further comprising:
    accessing user preference data indicating a representative narration audio recording from the plurality of narration audio recordings, and wherein the target variability information further indicates the target range of variability levels with respect to the one of power, frequency, or tempo of the representative narration audio recording.

5. The computer-implemented method of claim 4, wherein the user preference data comprises at least one of purchase history data or listening history data.

6. The computer-implemented method of claim 1, wherein determining the target variability information further comprises:
    determining a power variability level for at least the first sample portion, wherein the power variability level is determined with respect to power of audio data in the first sample portion;
    assigning the power variability level as a bottom threshold of the target range of variability levels of the target variability information.

7. The computer-implemented method of claim 1, further comprising:
    determining a second feature score of at least a third sample portion of audio data of a second narration audio recording, wherein the second feature score is determined with respect to at least one of a gender or accent of the voice in the third sample portion of audio data; and causing presentation, in the user interface, of:
a third user interface element for causing presentation of audio data from the third sample portion; and
a fourth user interface element for providing user feedback regarding the third sample portion.

8. The computer-implemented method of claim 7, further comprising:
receiving, user feedback regarding the third sample portion;
determining a first feature score of audio data of the first narration audio recording, wherein the first feature score is determined with respect to at least one of a gender or accent of the voice in the audio data of the first narration audio recording;
determining that the first feature score is above the second feature score; and
in response to determining that the first feature score is above the second feature score, selecting the first narration audio recording to be compared to the target variability information.

9. A computer-readable, non-transitory storage medium storing computer executable instructions that, when executed by one or more computing devices, configure the one or more computing devices to perform operations comprising:
determining, for each narration audio recording of a plurality of narration audio recordings, a variability level of at least a portion of audio data of the narration audio recording, wherein the variability level is determined with respect to one of power, frequency, or tempo of a voice in the audio data;
causing presentation of a user interface to provide an audio recording recommendation or a narrator recommendation based at least on user input, the user interface comprising:
a first graphical user interface element for a first narrator; and
a second graphical user interface element for a second narrator;
receiving, via the user interface, user input as a user selection of the first graphical user interface element instead of the second graphical user interface element that indicates a selection of the first narrator instead of the second narrator;
determining target variability information from a first sample portion for the first narrator, wherein the target variability information indicates target range of variability levels with respect to the one of power, frequency, or tempo;
identifying, from the plurality of narration audio recordings, a first narration audio recording based at least on comparing the target range of variability levels of at least the first sample portion to a first variability level of audio data of the first narration audio recording, wherein comparing the target range of variability levels to the first variability level comprises determining that the first variability level is within the target range of variability levels, wherein the first narration audio recording comprises audio for a third narrator different than the first narrator and the second narrator; and
causing presentation, in the user interface, of information identifying the first narration audio recording or the third narrator of the first narration audio recording as a recommendation.

10. The computer-readable, non-transitory storage medium of claim 9, wherein determining the variability level of the at least the portion of audio data of the narration audio recording further comprises:
identifying power from a Fourier series from the at least the portion of audio data of the narration audio recording;
determining a dimensionality score from the power from the Fourier series using dimension analysis; and
assigning the dimensionality score as the variability level.

11. The computer-readable, non-transitory storage medium of claim 10, wherein the dimension analysis comprises at least one of a box counting algorithm, a pair-counting algorithm, a fast fractal dimension algorithm, or a tug-of-war algorithm.

12. The computer-readable, non-transitory storage medium of claim 9, wherein the one or more computing devices are configured to perform operations further comprising:
receiving user preference data indicating a representative narration audio recording from the plurality of narration audio recordings, and wherein the target variability information further indicates the target range of variability levels with respect to the one of power, frequency, or tempo of the representative narration audio recording.

13. The computer-readable, non-transitory storage medium of claim 12, wherein the user preference data is based at least on receiving one or more selections of the representative narration audio recording.

14. The computer-readable, non-transitory storage medium of claim 12, wherein the user preference data comprises at least one of purchase history data or listening history data.

15. The computer-readable, non-transitory storage medium of claim 9, further comprising:
determining a second feature score of at least a second sample portion of audio data of a second narration audio recording, wherein the second feature score is determined with respect to at least one of a gender or accent of the voice in the second sample portion of audio data; and
causing presentation, in the user interface, of:
a third user interface element for causing presentation of audio data from the second sample portion; and
a fourth user interface element for providing user feedback regarding the second sample portion.

16. The computer-readable, non-transitory storage medium of claim 15, further comprising:
receiving user feedback regarding the second sample portion;
determining a first feature score of audio data of the first narration audio recording, wherein the first feature score is determined with respect to at least one of a gender or accent of the voice in the audio data of the first narration audio recording;
determining that the first feature score is above the second feature score; and
in response to determining that the first feature score is above the second feature score, selecting the first narration audio recording to be compared to the target variability information.

17. A system comprising:
an electronic data store; and
a hardware processor in communication with the electronic data store, the hardware processor configured to execute computer-executable instructions to at least:
determine, for each narration audio recording of a plurality of narration audio recordings, a variability level of at least a portion of audio data of the narration audio recording, wherein the variability level is determined with respect to one of power, frequency, or tempo of the audio data;

cause presentation of a user interface to provide an audio recording recommendation or a narrator recommendation based at least on user input, the user interface comprising:
- a graphical user interface element that is selectable to indicate a selection of a first narrator instead of a second narrator;

receive, via the user interface, user input as a user selection of the graphical user interface element that indicates the selection of the first narrator instead of the second narrator;

determine target variability information from a first sample portion for the first narrator, wherein the target variability information indicates a target range of variability levels with respect to the one of power, frequency, or tempo;

identifying, from the plurality of narration audio recordings, a first narration audio recording based at least on comparing the target range of variability levels of at least the first sample portion to a first variability level of audio data of the first narration audio recording, wherein comparing the target range of variability levels to the first variability level comprises determining that the first variability level is within the target range of variability levels, wherein the first narration audio recording comprises audio for a third narrator different than the first narrator and the second narrator; and cause presentation, in the user interface, of information identifying the first narration audio recording or a narrator of the first narration audio recording as a recommendation.

18. The system of claim 17, wherein determining the variability level of the at least the portion of audio data of the narration audio recording further comprises:
- identifying power from a Fourier series from the at least the portion of audio data of the narration audio recording;
- determining a dimensionality score from the power from the Fourier series using dimension analysis; and
- assigning the dimensionality score as the variability level.

19. The system of claim 17, wherein the hardware processor is further configured to execute computer-executable instructions to at least:
- access user preference data indicating a representative narration audio recording from the plurality of narration audio recordings, and wherein the target variability information further indicates the target range of variability levels with respect to the one of power, frequency, or tempo of the representative narration audio recording.

20. The system of claim 17, wherein determining the target variability information further comprises:
- determining a power variability level for at least the first sample portion, wherein the power variability level is determined with respect to power of audio data in the first sample portion;
- assigning the power variability level as a bottom threshold of the target range of variability levels of the target variability information.

* * * * *